(12) United States Patent
Ewing et al.

(10) Patent No.: US 9,104,393 B2
(45) Date of Patent: *Aug. 11, 2015

(54) POWER-MANAGER CONFIGURATION UPLOAD AND DOWNLOAD METHOD AND SYSTEM FOR NETWORK MANAGERS

(75) Inventors: Carrel W. Ewing, Incline Village, NV (US); Brian P. Auclair, Reno, NV (US); Mark J. Bigler, Eugene, OR (US); Andrew J. Cleveland, Reno, NV (US); James P. Maskaly, Sparks, NV (US); Jay Henley Williams, Yankton, SD (US)

(73) Assignee: Server Technology, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 12/853,193

(22) Filed: Aug. 9, 2010

(65) Prior Publication Data
US 2010/0306559 A1 Dec. 2, 2010

Related U.S. Application Data

(63) Continuation of application No. 09/892,350, filed on Jun. 26, 2001, now Pat. No. 7,774,443.

(51) Int. Cl.
*G06F 1/26* (2006.01)
*G06F 1/32* (2006.01)

(52) U.S. Cl.
CPC .............. *G06F 1/26* (2013.01); *G06F 1/3209* (2013.01); *G06F 1/3246* (2013.01)

(58) Field of Classification Search
CPC ......... G06F 1/1635; G06F 1/189; G06F 1/26; G06F 1/3246; G06F 1/3209; H04H 47/14; G05B 19/10; G05B 10/106; Y02B 60/1296; Y02B 20/16; H04B 3/54

USPC .......... 713/300, 310, 320, 323, 324, 340; 307/112–113, 125–126, 130–131, 307/132 E; 340/3.1
See application file for complete search history.

(56) References Cited

U.S. PATENT DOCUMENTS

| | | |
|---|---|---|
| 4,051,326 A | 9/1977 | Badagnani et al. |
| 4,101,878 A | 7/1978 | Shimizu et al. |

(Continued)

FOREIGN PATENT DOCUMENTS

WO WO-9310615 A1 5/1993

OTHER PUBLICATIONS

"APC's Motion for Summary Judgment of Non-Infringement and Invalidity," *Server Technology, Inc.* v. *American Power Conversion Corporation*, Case No. 3:06-CV-00698-LRH-VPC, 2pp. (Nov. 4, 2010).

(Continued)

*Primary Examiner* — Fahmida Rahman
(74) *Attorney, Agent, or Firm* — Perkins Coie LLP

(57) ABSTRACT

A power management system embodiment of the present invention comprises a power manager with a network agent in communication over a network with a network manager. The power manager is connected to control the operating power flowing to various pieces of computer network equipment at a single site. A user is able to assign names to each control port, and the power manager maintains a list of enrolled users who have access. Many operational mode choices are possible, and each can be configured by the user while remote from the power manager. The power manager can be commanded to upload a user configuration list, and it can be commanded to accept a downloaded user configuration list.

25 Claims, 5 Drawing Sheets

(56) References Cited

U.S. PATENT DOCUMENTS

| | | | |
|---|---|---|---|
| 4,206,444 A | 6/1980 | Ferlan | |
| 4,356,545 A | 10/1982 | West | |
| 4,442,319 A | 4/1984 | Treidl | |
| 4,495,568 A | 1/1985 | Gilbert et al. | |
| 4,611,289 A | 9/1986 | Coppola | |
| 4,638,175 A | 1/1987 | Bradford et al. | |
| 4,644,320 A | 2/1987 | Carr et al. | |
| 4,647,721 A | 3/1987 | Busam et al. | |
| 4,674,031 A | 6/1987 | Siska, Jr. | |
| 4,701,946 A | 10/1987 | Oliva et al. | |
| 4,709,318 A | 11/1987 | Gephart et al. | |
| 4,719,364 A | 1/1988 | Pequet et al. | |
| 4,729,375 A | 3/1988 | Jegers et al. | |
| 4,769,555 A | 9/1988 | Pequet et al. | |
| 4,777,607 A | 10/1988 | Maury et al. | |
| 4,780,714 A | 10/1988 | Moustakas et al. | |
| 4,814,941 A | 3/1989 | Speet et al. | |
| 4,918,562 A | 4/1990 | Pulizzi et al. | |
| 4,937,561 A | 6/1990 | Sasaki et al. | |
| 5,164,609 A | 11/1992 | Poppe et al. | |
| 5,198,806 A | 3/1993 | Lord | |
| 5,319,571 A | 6/1994 | Langer et al. | |
| 5,359,540 A | 10/1994 | Ortiz | |
| 5,374,922 A | 12/1994 | Ebersohl | |
| 5,381,554 A | 1/1995 | Langer et al. | |
| 5,410,713 A | 4/1995 | White et al. | |
| 5,412,645 A | 5/1995 | Younkin et al. | |
| 5,424,903 A | 6/1995 | Schreiber | |
| 5,436,510 A | 7/1995 | Gilbert | |
| 5,481,730 A | 1/1996 | Brown et al. | |
| 5,485,576 A | 1/1996 | Fee et al. | |
| 5,495,607 A | 2/1996 | Pisello et al. | |
| 5,506,573 A | 4/1996 | Ewing et al. | |
| 5,506,790 A | 4/1996 | Nguyen | |
| 5,534,734 A | 7/1996 | Pugh et al. | |
| 5,537,462 A | 7/1996 | Utter et al. | |
| 5,561,769 A | 10/1996 | Kumar et al. | |
| 5,563,455 A | 10/1996 | Cheng | |
| 5,579,201 A | 11/1996 | Karageozian | |
| 5,585,678 A | 12/1996 | Dijk et al. | |
| 5,596,628 A | 1/1997 | Klein | |
| 5,642,002 A | 6/1997 | Mekanik et al. | |
| 5,650,771 A | 7/1997 | Lee | |
| 5,651,006 A | 7/1997 | Fujino et al. | |
| 5,652,893 A | 7/1997 | Ben-Meir et al. | |
| 5,687,079 A | 11/1997 | Bauer et al. | |
| 5,717,934 A | 2/1998 | Pitt et al. | |
| 5,721,934 A | 2/1998 | Scheurich | |
| 5,732,212 A | 3/1998 | Perholtz et al. | |
| 5,732,281 A | 3/1998 | Summers et al. | |
| 5,736,847 A | 4/1998 | Van Doorn et al. | |
| 5,761,084 A | 6/1998 | Edwards | |
| 5,768,148 A | 6/1998 | Murphy et al. | |
| 5,774,979 A | 7/1998 | Kraft | |
| 5,781,434 A | 7/1998 | Tobita et al. | |
| 5,835,700 A | 11/1998 | Carbonneau | |
| 5,862,391 A | 1/1999 | Salas et al. | |
| 5,909,180 A | 6/1999 | Bailey et al. | |
| 5,923,103 A | 7/1999 | Pulizzi et al. | |
| 5,933,637 A * | 8/1999 | Hurley et al. | 717/107 |
| 5,949,974 A | 9/1999 | Ewing et al. | |
| 5,982,652 A | 11/1999 | Simonelli et al. | |
| 5,991,885 A | 11/1999 | Chang et al. | |
| 5,995,911 A | 11/1999 | Hart | |
| 6,002,340 A * | 12/1999 | Smith | 340/3.4 |
| 6,008,805 A | 12/1999 | Land et al. | |
| 6,011,329 A | 1/2000 | McGovern | |
| 6,029,092 A | 2/2000 | Stein | |
| 6,031,354 A | 2/2000 | Wiley et al. | |
| 6,035,264 A | 3/2000 | Donaldson et al. | |
| 6,046,513 A | 4/2000 | Jouper et al. | |
| 6,086,397 A | 7/2000 | Chapman et al. | |
| 6,160,873 A | 12/2000 | Truong et al. | |
| 6,181,027 B1 | 1/2001 | Grady | |
| 6,229,691 B1 | 5/2001 | Tanzer et al. | |
| 6,266,713 B1 * | 7/2001 | Karanam et al. | 710/9 |
| 6,298,449 B1 | 10/2001 | Carter | |
| 6,360,277 B1 | 3/2002 | Ruckley et al. | |
| 6,379,164 B1 * | 4/2002 | Cash, Jr. | 439/106 |
| 6,381,700 B1 | 4/2002 | Yoshida | |
| 6,388,854 B1 | 5/2002 | Berstis et al. | |
| 6,400,043 B1 | 6/2002 | Batson et al. | |
| 6,408,334 B1 | 6/2002 | Bassman et al. | |
| 6,408,395 B1 | 6/2002 | Sugahara et al. | |
| 6,445,087 B1 * | 9/2002 | Wang et al. | 307/40 |
| 6,459,175 B1 | 10/2002 | Potega | |
| 6,476,729 B1 | 11/2002 | Liu | |
| 6,480,964 B1 * | 11/2002 | Oh | 713/310 |
| 6,496,103 B1 | 12/2002 | Weiss et al. | |
| 6,507,273 B1 * | 1/2003 | Chang et al. | 340/3.1 |
| 6,519,509 B1 | 2/2003 | Nierlich et al. | |
| 6,557,170 B1 * | 4/2003 | Wilder et al. | 725/130 |
| 6,608,406 B2 | 8/2003 | Bersiek | |
| 6,628,009 B1 | 9/2003 | Chapel | |
| 6,642,852 B2 | 11/2003 | Dresti et al. | |
| 6,643,566 B1 | 11/2003 | Lehr et al. | |
| 6,684,343 B1 | 1/2004 | Bouchier et al. | |
| 6,711,163 B1 | 3/2004 | Reid et al. | |
| 6,711,613 B1 | 3/2004 | Ewing et al. | |
| 6,715,088 B1 | 3/2004 | Togawa | |
| 6,741,442 B1 * | 5/2004 | McNally et al. | 361/166 |
| 6,762,675 B1 | 7/2004 | Cafiero et al. | |
| 6,826,036 B2 | 11/2004 | Pereira | |
| 6,839,775 B1 | 1/2005 | Kao et al. | |
| 6,968,465 B2 | 11/2005 | Freevol et al. | |
| 7,010,589 B2 | 3/2006 | Ewing et al. | |
| 7,043,543 B2 | 5/2006 | Ewing et al. | |
| 7,099,934 B1 | 8/2006 | Ewing et al. | |
| 7,119,676 B1 | 10/2006 | Silverstrim et al. | |
| 7,141,891 B2 | 11/2006 | McNally et al. | |
| 7,162,521 B2 | 1/2007 | Ewing et al. | |
| 7,171,461 B2 | 1/2007 | Ewing et al. | |
| 7,171,542 B1 * | 1/2007 | Alfano et al. | 712/38 |
| 7,349,956 B2 | 3/2008 | Anderson et al. | |
| 7,702,771 B2 | 4/2010 | Ewing et al. | |
| 2002/0004913 A1 | 1/2002 | Fung | |
| 2002/0007463 A1 | 1/2002 | Fung | |
| 2002/0043960 A1 | 4/2002 | Janik | |
| 2002/0052940 A1 * | 5/2002 | Myers et al. | 709/223 |
| 2002/0104031 A1 | 8/2002 | Tomlinson et al. | |
| 2002/0120676 A1 | 8/2002 | Biondi et al. | |
| 2003/0200473 A1 | 10/2003 | Fung | |
| 2004/0024913 A1 | 2/2004 | Ikeda et al. | |
| 2004/0039821 A1 | 2/2004 | Giglio et al. | |
| 2004/0047095 A1 | 3/2004 | Reynolds et al. | |
| 2004/0057179 A1 | 3/2004 | Galang et al. | |
| 2004/0221181 A1 | 11/2004 | Yu | |
| 2005/0071699 A1 | 3/2005 | Hammond et al. | |
| 2005/0141154 A1 | 6/2005 | Consadori et al. | |
| 2005/0203987 A1 | 9/2005 | Ewing et al. | |
| 2005/0223090 A1 | 10/2005 | Ewing et al. | |
| 2006/0031453 A1 | 2/2006 | Ewing et al. | |
| 2006/0031454 A1 | 2/2006 | Ewing et al. | |
| 2006/0072531 A1 | 4/2006 | Ewing et al. | |
| 2006/0143289 A1 | 6/2006 | Smith et al. | |
| 2006/0186739 A1 | 8/2006 | Grolnic et al. | |
| 2006/0259538 A1 | 11/2006 | Ewing et al. | |
| 2007/0016664 A1 | 1/2007 | Ewing et al. | |
| 2007/0050443 A1 | 3/2007 | Ewing et al. | |
| 2007/0076340 A1 | 4/2007 | Ewing et al. | |
| 2007/0130243 A1 | 6/2007 | Ewing et al. | |
| 2007/0136453 A1 | 6/2007 | Ewing et al. | |
| 2007/0140238 A1 | 6/2007 | Ewing et al. | |
| 2007/0288558 A1 | 12/2007 | Land et al. | |
| 2008/0190639 A1 | 8/2008 | Baran et al. | |

OTHER PUBLICATIONS

"APC's Memorandum of Law in Support of Its Motion for Summary Judgment of Non-Infringement and Invalidity" and Exhibits 1-21; *Server Technology, Inc. v. American Power Conversion Corporation*, Case No. 3:06-CV-00698-LRH-VPC, 708 pp., (Nov. 4, 2010).

(56) References Cited

OTHER PUBLICATIONS

Detailed Request for Inter Partes Reexamination Under 35 U.S.C. §§311-318 and 37 C.F.R. §1.902 et Seq. dated Nov. 12, 2010; Reexamination Control No. 95/001,485; 60 pp.
Order Granting Request for Inter Partes Reexamination dated Jan. 15, 2011; Reexamination Control No. 95/001,485; USPTO.
Office Action dated Jan. 15, 2011; Reexamination Control No. 95/001,485; USPTO.
Office Action dated Oct. 20, 2010; U.S. Appl. No. 11/548,175; USPTO.
Office Action dated Jan. 31, 2011; U.S. Appl. No. 11/548,201; USPTO.
Office Action dated Jan. 10, 2011; U.S. Appl. No. 11/548,187; USPTO.
Office Action dated Nov. 2, 2010; U.S. Appl. No. 11/458,988; USPTO.
Office Action dated Jan. 25, 2011; U.S. Appl. No. 11/459,011; USPTO.
Office Action dated Dec. 29, 2010; U.S. Appl. No. 11/370,489; USPTO.
Office Action dated Nov. 3, 2010; U.S. Appl. No. 11/243,823; USPTO.
Office Action dated Jul. 21, 2010; U.S. Appl. No. 11/126,092; USPTO.
Office Action dated Aug. 10, 2010; U.S. Appl. No. 11/243,701; USPTO.
"APC's Amended Answer, Affirmative Defenses, and Counterclaims to STI's Second Amended Complaint for Patent Infringement; Demand for Jury Trial and Exhibits A-F," *Server Technology, Inc.* v. *American Power Conversion Corporation*, Case No. 3:06-CV-00698-LRH-VPC, 88 pp. (Jan. 18, 2011).
"Plaintiff Server Technology Inc.'s Answer to Amended Counterclaims; Jury Demand," *Server Technology, Inc.* v. *American Power Conversion Corporation*, Case No. 3:06-CV-00698-LRH-VPC, 23 pp. (Feb. 1, 2011).
"American Power Conversion Corporation's Final Invalidity Contentions and Exhibits A-D," *Server Technology, Inc.* v. *American Power Conversion Corporation*, Case No. 3:06-CV-00698-LRH-VPC, 165 pp. (Feb. 4, 2011).
Interworking Labs Releases New, Extended SNMP Test Suite with Windows NT and Windows 95 Support, Interworking Labs, pp. 1-2, Jul. 15, 1996.
2T-HA10F-CD 3.6 kVA Uninterruptible Power System: Operating information, Digital Equipment Corp., Order No. EK-HA10F-OP. B01, pp. 1-1 to 5-4, Aug. 1992.
A Software managing Clustered Multi-Vender Uninteruptible Power Supply on Network, IBM Tech. Disclosure Bulletin, vol. 42, No. 419, Mar. 1, 1999.
Touch-Pad Code-Actuated Electrical Outlet, IBM Tech. Disclosure Bulletin, vol. 33, No. 1A, 143-147, Jun. 1, 1990.
UPS MIB, Merling Gerin—DAM Division, www.exploits.org/nut/library/protocols/snmp/mgeups.mib, pp. 1-41, Oct. 11, 1995.
Liebert SiteNet SNMP MIBs, The Latest MIBs Available for Download, http://www.liebert.com/products/english/products/software/snmp/intro.asp?ID=921, pp. 1-2, Jul. 2, 2003.
Newman, J., Enterprise Power Protection: Don't Get UPSet; Get the Right UPS Instead, Network Computing, vol. 7, No. 2, pp. 1-10, Feb. 15, 1996.
"Expert Witness Report of Douglas Bors, PE" *Server Technology, Inc.* v. *American Power Conversion Corporation*, Case No. 3:06-CV-00698-LRH-VPC, 87 pp. (May 27, 2011).
"Expert Witness Report of Dr. Mark Horenstein Regarding Invalidity of STI's Patents" *Server Technology, Inc.* v. *American Power Conversion Corporation*, Case No. 3:06-CV-00698-LRH-VPC, 137 pp. (May 27, 2011).
"Expert Report of KC Mares" *Server Technology, Inc.* v. *American Power Conversion Corporation*, Case No. 3:06-CV-00698-LRH-VPC, 204 pp. (May 27, 2011).
"Rebuttal Expert Witness Report of Douglas Bors, PE" *Server Technology, Inc.* v. *American Power Conversion Corporation*, Case No. 3:06-CV-00698-LRH-VPC, 19 pp. (Jun. 29, 2011).
"Expert Report of B. Michael Aucoin, D. Engr., PE, PMP Consolidated Rebuttal of APC's Expert Invalidity Reports" *Server Technology, Inc.* v. *American Power Conversion Corporation*, Case No. 3:06-CV-00698-LRH-VPC, 152 pp. (Jun. 29, 2011).
"Expert Report of KC Mares (In Rebuttal to APC'S Invalidity Reports)" *Server Technology, Inc.* v. *American Power Conversion Corporation*, Case No. 3:06-CV-00698-LRH-VPC, 33 pp. (Jun. 29, 2011).
"American Power Conversion Motion for Summary Judgment" *Server Technology, Inc.* v. *American Power Conversion Corporation*; Case No. 3:06-cv-00698-LRH-VPC; 4 pp.; Aug. 30, 2011.
"APC's Memorandum of Law in Support of Its Motion for Summary Judgment and Exhibits" *Server Technology, Inc.* v. *American Power Conversion Corporation*; Case No. 3:06-cv-00698-LRH-VPC; 75 pp.; Aug. 30, 2011.
"STI's Response to APC's Motion for Summary Judgment" *Server Technology, Inc.* v. *American Power Conversion Corporation*; Case No. 3:06-cv-00698-LRH-VPC; 85 pp.; Sep. 26, 2011.
"APC's Reply in Support of Summary Judgment and Exhibits" *Server Technology, Inc.* v. *American Power Conversion Corporation*; Case No. 3:06-cv-00698-LRH-VPC; 90 pp.; Oct. 14, 2011.
"Patent Owner's Revised Response to Non-Final Office Action, and Exhibits," Reexamination Control No. 95/001,485; 615 pp.; Jun. 20, 2011.
"Requestor's Revised Comments on Office Action of Jan. 15, 2011 and Patent Owner's Revised Response, and Exhibits," Reexamination Control No. 95/001,485; 380 pp.; Sep. 29, 2011.
Betty Yuan, "Remote Control Equals Power," Teleconnect, Feb. 2000, pp. 60-66, New York, NY USA.
Office Action dated Jun. 10, 2010; U.S. Appl. No. 11/125,963; USPTO.
Office Action dated Dec. 19, 2011; U.S. Appl. No. 11/243,823; USPTO.
Office Action dated Oct. 13, 2011; U.S. Appl. No. 11/459,011; USPTO.
Office Action dated Oct. 13, 2011; U.S. Appl. No. 11/548,187; USPTO.
Office Action dated Jun. 8, 2010; U.S. Appl. No. 11/738,417; USPTO.
Office Action dated Dec. 22, 2011; U.S. Appl. No. 11/126,092; USPTO.
Office Action dated Feb. 1, 2011; U.S. Appl. No. 12/763,137; USPTO.
"American Power Conversion Corporation's Initial Disclosure of Noninfringement, Invalidity, and Unenforceability Contentions," *Server Technology, Inc.* v. *American Power Conversion Corporation*; Case No. 3:11-CV-00068-ECR-(RAM); 26 pp.; Dec. 16, 2011.
"Exhibits A1 to A3 of American Power Conversion Corporation's Initial Disclosure of Noninfringement, Invalidity, and Unenforceability Contentions," *Server Technology, Inc.* v. *American Power Conversion Corporation*; Case No. 3:11-CV-00068-ECR-(RAM); 15 pp.; Dec. 16, 2011.
"Amended Complaint for Patent Infringement," *Server Technology, Inc.* v. *American Power Conversion Corporation*; Case No. 3:11-CV-00068-ECR-(RAM); 45 pp.; Apr. 28, 2011.
"American Power Conversion Corporation's Answer, Defenses and Counterclaims to Plaintiff's Amended Complaint," *Server Technology, Inc.* v. *American Power Conversion Corporation*; Case No. 3:11-CV-00068-ECR-(RAM); 10 pp.; May 12, 2011.
"Second Amended Complaint for Patent Infringement," *Server Technology, Inc.* v. *American Power Conversion Corporation*; Case No. 3:11-CV-00068-ECR-(RAM); 99 pp.; Dec. 19, 2011.
"American Power Conversion Corporation's Answer, Defenses and Counterclaims to Plaintiff's Second Amended Complaint," *Server Technology, Inc.* v. *American Power Conversion Corporation*; Case No. 3:11-CV-00068-ECR-(RAM); 17 pp.; Jan. 9, 2012.
American Power Conversion Corporation, "MasterSwitch Power Distribution Unit User's Guide," Mar. 2001, 56 pp., USA.
American Power Conversion Corporation, "MasterSwitch VM Power Distribution Unit User Guide," Dec. 1999, 51 pp., USA.

(56) References Cited

OTHER PUBLICATIONS

Systems Enhancement Corporation, "Power Administrator 800 User Manual," Oct. 1, 1996, 78 pp., USA.
Bay Technical Associates, Inc., "Owner's Manual, Baytech Remote Power Control Unit," Jan. 2000, 80 pp., USA.
Bay Technical Associates, Inc., "Addendum to Owner's Manual, DS30/RPC-21," 1999, 4 pp., USA.
American Power Conversion Corporation, "MasterSwitch Installation and Quick Start Manual," Oct. 1999, 15 pp., USA.
Office Action dated Jul. 6, 2012; U.S. Appl. No. 11/243,823; USPTO; 31 pp.
Office Action dated May 3, 2012; U.S. Appl. No. 13/214,050; USPTO; 12 pp.
Office Action dated Mar. 13, 2012; U.S. Appl. No. 13/091,082; USPTO; 47 pp.
Office Action dated Mar. 16, 2012; U.S. Appl. No. 12/963,538; USPTO; 50 pp.
Office Action dated Apr. 18, 2012; U.S. Appl. No. 11/126,092; USPTO; 28 pp.
Office Action dated Mar. 6, 2012; U.S. Appl. No. 12/965,563; USPTO; 20 pp.
American Power Conversion Corporation; Masterswitch VM Power Distribution Unit User Guide; 1999; 51 pp.
American Power Conversion Corporation; MasterSwitch VM Power Distribution Unit Installation and Quick Start Manual; 2000; 20 pp.
American Power Conversion Corporation; PowerNet SNMP Management Information Base (MIB) v3.1.0 Reference Guide; 1999; 48 pp.
Bay Technical Associates, Inc.; download of www.BayTech.net from web.archive.org; 1997; 8 pp.
Bay Technical Associates, Inc.; Owner's Manual for BayTech Remote Power Control Unit for Models RPC-2, RPC-2A, RPC-2 MD01, RPC3-15 Amp, RPC3-20 Amp, RPC-3A, RPC-4, RPC-5, RPC-7, RPC-21; Jan. 2000; 80 pp.
M2 Communications Ltd. M2 Presswire; BayTech's vertically mounted power strip helps network managers keep equipment up and running; Nov. 19, 1999; 1 p.
Systems Enhancement Corporation; Power Administrator 800: User's Manual; 1996; 50 pp.
Office Action dated Jan. 31, 2011; U.S. Appl. No. 11/548,201; USPTO; 30 pp.
Office Action dated Mar. 29, 2012; Reexamination Control No. 95/001,485; USPTO; 103 pp.
Server Technology, Inc.; "Patent Owner's Response to Non-Final Office Action"; Reexamination Control No. 95/001,485; May 29, 2012; 56 pp.
Carrel W. Ewing; "Second Declaration of Carrel W. Ewing Under 37 CFR §1.132"; Reexamination Control No. 95/001,485; May 29, 2012; 140 pp.
Michael B. Aucoin; "Second Declaration of B. Michael Aucoin Under 37 CFR 1.132"; Reexamination Control No. 95/001,485; May 29, 2012; 58 pp.
Chris Hardin; "Second Declaration of Chris Hardin Under 37 CFR 1.132"; Reexamination Control No. 95/001,485; May 29, 2012; 9 pp.
KC Mares; "Second Declaration of KC Mares Under 37 CFR 1.132"; Reexamination Control No. 95/001,485; May 29, 2012; 5 pp.
Michael R. Henson; "Declaration of Michael R. Henson Under 37 CFR §1.132"; Reexamination Control No. 95/001,485; May 29, 2012; 30 pp.
American Power Conversion Corporation; "Notice of Second Office Action in Reexamination Proceedings," Server Technology, Inc. v. American Power Conversion Corporation; Case No. 3:06-CV-00698-LRH-VPC; Apr. 10, 2012; 87 pp.
Server Technology, Inc.; "STI's Response to APC's Notice of Second Office Action in Reexamination Proceedings," Server Technology, Inc. v. American Power Conversion Corporation; Case No. 3:06-CV-00698-LRH-VPC; Apr. 18, 2012; 5 pp.
Mirapath, A Cyclades Premier Partner, "AlterPath PM User Guide," 49 pages, © 2003.

Server Technology, Inc., "MasterSwitch", 1996, Server Technology, Inc., Reno, Nevada.
Server Technology, Inc., "VersaTimer Operations Manual, Thank you for purchasing the VersaTimer," 3 pages, © 1995.
Server Technology, Inc., "VersaTimer, A 7-Day, Programmable Power Scheduler," 2 pages, © 1994.
Western Telematic, Inc., "NPS Series Network Power Switch Models NPS-115 and NPS-230, WTI Part No. 12927 Rev. C, User's Guide," 19 pages, © 1999.
Complaint for Patent Infringement, Server Technology, Inc. v. American Power Conversion Corporation, Case No. 3:06-CV-.sub.--, 61 pp. (Dec. 18, 2006).
First Amended Complaint for Patent Infringement, Server Technology, Inc. v. American Power Conversion Corporation, Case No. 3:06-CV-00698-LRH-VPC, 83 pp. (Feb. 20, 2007).
Defendant's Answer and Affirmative Defenses to Plaintiffs Complaint for Patent Infringement; Counterclaims for Declaratory Judgment of Patent Noninfringement and Patent Invalidity; and Patent Infringement; Demand for Jury Trial, Server Technology, Inc. v. American Power Conversion Corporation, Case No. 3:06-CV-00698-LRH-VPC, 37 pp. (Apr. 2, 2007).
Plaintiff Server Technology Inc.'s Reply to Defendant's First Amended Counterclaims for Declaratory Judgment of Patent Noninfringement and Patent Invalidity; and Patent Infringement; Jury Demand, Server Technology, Inc. v. American Power Conversion Corporation, Case No. 3:06-CV-00698-LRH-VPC, 8 pp. (Apr. 30, 2007).
Server Technology, Inc.'s Fifth Amended Disclosure of Asserted Claims and Preliminary Infringement Contentions With Exhibits, Server Technology, Inc. v. American Power Conversion Corporation, Case No. 3:06-CV-00698-LRH-VPC, 30 pp. (Sep. 29, 2007).
American Power Conversion Corporation's Preliminary Invalidity Contentions, Server Technology, Inc. v. American Power Conversion Corporation, Case No. 3:06-CV-00698-LRH-VPC, 89 pp. (Oct. 12, 2007).
American Power Conversion Corporation's Preliminary Claim Constructions and Extrinsic Evidence (Patent Local Rule 4-2), Server Technology, Inc. v. American Power Conversion Corporation, Case No. 3:06-CV-00698-LRH-VPC, 8 pp. (Jan. 21, 2008).
Plaintiff and Counterdefendant Server Technology, Inc.'s Preliminary Claim Constructions and Extrinsic Evidence (Patent Local Rule 4-2), Server Technology, Inc. v. American Power Conversion Corporation, Case No. 3:06-CV-00698-LRH-VPC, 7 pp. (Jan. 29, 2008).
Joint Claim Construction Chart and Prehearing Statement (Patent Rule 4.3), Server Technology, Inc. v. American Power Conversion Corporation, Case No. 3:06-CV-00698-LRH-VPC, 77 pp. (Feb. 22, 2008).
Plaintiff and Counterdefendant Server Technology, Inc.'s Opening Claim Construction Brief, Server Technology, Inc. v. American Power Conversion Corporation, Case No. 3:06-CV-00698-LRH-VPC, 206 pp. (May 19, 2008).
American Power Conversion Corp.'s Response to Plaintiff and Counterdefendant Server Technology, Inc.'s Opening Claim Construction Brief, Server Technology, Inc. v. American Power Conversion Corporation, Case No. 3:06-CV-00698-LRH-VPC, 279 pp. (Jul. 25, 2008).
Plaintiff and Counterdefendant Server Technology, Inc.'s Reply to APC's Response to STI's Opening Claim Construction Brief, Server Technology, Inc. v. American Power Conversion Corporation, Case No. 3:06-CV-00698-LRH-VPC, 287 pp. (Aug. 8, 2008).
Continuation of Server Technology's Reply to American Power Conversion Corp.'s Response to Opening Claim Construction Brief, Server Technology, Inc. v. American Power Conversion Corporation, Case No. 3:06-CV-00698-LRH-VPC, 94 pp. (Aug. 11, 2008).
Server Technology's Proposed Order on Claim Construction, Server Technology, Inc. v. American Power Conversion Corporation, Case No. 3:06-CV-00698-LRH-VPC, 22 pp. (Dec. 5, 2008).
American Power Conversion Corp.'s Proposed Order on Claim Construction, Server Technology, Inc. v. American Power Conversion Corporation, Case No. 3:06-CV-00698-LRH-VPC, 24 pp. (Dec. 5, 2008).
American Power Conversion Corporation's Response to Server Technology's Proposed Order on Claim Construction, Server Tech-

(56) References Cited

OTHER PUBLICATIONS nology, Inc. v. American Power Conversion Corporation, Case No. 3:06-CV-00698-LRH-VPC, 24 pp. (Jan. 5, 2009).
Server Technology's Response in Opposition to APC's Proposed Order on Claim Construction, Server Technology, Inc. v. American Power Conversion Corporation, Case No. 3:06-CV-00698-LRH-VPC, 23 pp. (Jan. 6, 2009).
Server Technology's Corrected Response in Opposition to APC's Proposed Order on Claim Construction, Server Technology, Inc. v. American Power Conversion Corporation, Case No. 3:06-CV-00698-LRH-VPC, 23 pp. (Jan. 8, 2009).
American Power Conversion Corporation's Reply Regarding Server Tech.'s Proposed Order on Claim Construction, Server Technology, Inc. v. American Power Conversion Corporation, Case No. 3:06-CV-00698-LRH-VPC, 13 pp. (Jan. 12, 2009).
Server Technology's Reply to APC's Response to Server Technology's Proposed Order on Claim Construction, Server Technology, Inc. v. American Power Conversion Corporation, Case No. 3:06-CV-00698-LRH-VPC, 13 pp. (Jan. 12, 2009).
American Power Conversion Corporation's Motion for Leave to File a Surreply to Server Tech.'s Reply Brief on Claim Construction, Server Technology, Inc. v. American Power Conversion Corporation, Case No. 3:06-CV-00698-LRH-VPC, 3 pp. (Jan. 22, 2009).
American Power Conversion Corporation's Surreply to Server Tech.'s Reply Brief on Claim Construction, Server Technology, Inc. v. American Power Conversion Corporation, Case No. 3:06-CV-00698-LRH-VPC, 5 pp. (Jan. 22, 2009).
Server Technology's Response in Opposition to APC's Motion to File a Surreply to Server Technology's Reply Brief on Claim Construction, Server Technology, Inc. v. American Power Conversion Corporation, Case No. 3:06-CV-00698-LRH-VPC, 9 pp. (Feb. 7, 2009).
American Power Conversion Motion for Summary Judgment, Server Technology, Inc. v. American Power Conversion Corporation; Case No. 3:06-cv-00698-LRH-VPC; 4 pp.; (Aug. 30, 2011).
Complaint for Patent Infringement, Server Technology, Inc. v. American Power Conversion Corporation, Case No. 3:11-CV-00068-LRH-WGC; In the United States District Court, District of Nevada; 85 pp.; Jan. 28, 2011.
Amended Complaint for Patent Infringement, Server Technology, Inc. v. American Power Conversion Corporation, Case No. 3:11-CV-00068-LRH-WGC; In the United States District Court, District of Nevada;45 pp.; Apr. 28, 2011.
Second Amended Complaint for Patent Infringement, Server Technology, Inc. v. American Power Conversion Corporation, Case No. 3:11-CV-00068-LRH-WGC;In the United States District Court, District of Nevada; 99 pp.; Dec. 19, 2011.
Joint Claim Construction and Prehearing Statement, Server Technology, Inc. v. American Power Conversion Corporation, Case No. 3:11-CV-00068-LRH-WGC;In the United States District Court, District of Nevada; 90 pp.; Mar. 14, 2012.
STI's Opening Claim Construction Brief, Server Technology, Inc. v. American Power Conversion Corporation, Case No. 3:11-CV-00068-LRH-WGC; In the United States District Court, District of Nevada;246 pp.; May 14, 2012.
Notice of Filing of STI's Corrected Opening Claim Construction Brief, Server Technology, Inc. v. American Power Conversion Corporation, Case No. 3:11-CV-00068-LRH-WGC; In the United States District Court, District of Nevada; 67 pp.; May 18, 2012.
American Power Conversion's Claim Construction Brief, Server Technology, Inc. v. American Power Conversion Corporation, Case No. 3:11-CV-00068-LRH-WGC; In the United States District Court, District of Nevada; 132 pp.; Jun. 11, 2012.
Declaration of Kristopher R. Kiel in Support of American Power Conversion's Claim Construction Brief, Server Technology, Inc. v. American Power Conversion Corporation, Case No. 3:11-CV-00068-LRH-WGC; In the United States District Court, District of Nevada; 779 pp.; Jun. 11, 2012.

STI's Reply Claim Construction Brief; Server Technology, Inc. v. American Power Conversion Corporation, Case No. 3:11-CV-00068-LRH-WGC; In the United States District Court, District of Nevada; 75 pp.; Jul. 2, 2012.
"APC MasterSwitch", PC Magazine, May 5, 1998.
"Keeping Up With . . . ", Internet Telephony, Mar. 2000, pp. 84-87.
"Rebooting Across the Net", PC Magazine, May 5, 1998.
"Server Technology Sentry R-2000", PC Magazine, May 5, 1998.
American Power Conversion, "APC NetShelter", 1995, #996-0643-A, APC, West Kingston, RI 02892 USA.
American Power Conversion, "APC Smart-UPS RM", 1996, #996-0618-B, APC, West Kingston, RI 02892 USA.
American Power Conversion, "APC Smart-UPS XL", 1996, #996-0630-B, APC, West Kingston, RI 02892 USA.
American Power Conversion, "Application Note #A2", Oct. 1993, APC, West Kingston, RI 02892 USA.
American Power Conversion, "Application Note #A6", Oct. 1993, APC, West Kingston, RI 02892 USA.
American Power Conversion, "Application Notes", Oct. 1996, #996-0495-C, APC, West Kingston, RI 02892 USA.
American Power Conversion, "Built-in Serial UPS Support In Windows 2000 Developed by APC", Dec. 6, 2000, APC, West Kingston, RI 02892USA.
American Power Conversion, "Call-UPS", 1991, #996-0070, APC, West Kingston, RI 02892 USA.
American Power Conversion, "Internetworking Power Protection", 1996, #996-0295-B, APC, West Kingston, RI 02892 USA.
American Power Conversion, "Internetworking Power Protection", Jan. 1994, # 996-0295, APC, West Kingston, RI 02892 USA.
American Power Conversion, "Introducing the UPS to build your business on . . .", Oct. 1993, #996-0207-A, APC, West Kingston, RI 02892 USA.
American Power Conversion, "MasterSwitch plus", Dec. 6, 2000, APC, West Kingston, RI 02892USA.
American Power Conversion, "Measure-UPS", Mar. 1993, #996-0127, APC, West Kingston, RI 02892 USA.
American Power Conversion, "PowerChute plus", 1996, #996-0041-C, APC, West Kingston, RI 02892USA.
American Power Conversion, "PowerNet", 1996, #996-0325D, APC, West Kingston, RI 02892USA.
American Power Conversion, "PowerNet SNMP Adapter", Jan. 1994, #996-0126, APC, West Kingston, RI 02892 USA.
American Power Conversion, "PowerNet", 1998, #996-0325D, APC, West Kingston, RI 02892 USA.
American Power Conversion, "PowerNet", Sep. 1995, #996-0325-b, APC, West Kingston, RI 02892 USA.
American Power Conversion, "Smart-UPS", 1996, #996-0386-E APC, West Kingston, RI 02892USA.
American Power Conversion, "Solutions '94", Feb. 1994, #996-0131, APC, West Kingston, RI 02892 USA.
American Power Conversion, "UPS Accessories", 1996, #996-0411-C, APC, West Kingston, RI 02892 USA.
Davison, M., et al. UPS Management Information Base, Internet Draft, IETF, pp. 1-28, May 13, 1992.
Distributed Power Module Product List, Sep. 23, 2002.
Drake, P., "Using SNMP to Manage Networks", pp. 2/1-2/4, 1991.
Ewing, B. and Mallory, J., "Power-ON/OFF-Product Information", 1990, Server Technology, Inc., Reno, Nevada.
Intelligent Power Module © 1991.
Local and Remote Power-On/Off Alternatives © 1991.
Needleman, R., "Power-ON/OFF Lets You Turn on Remote PCs by Phone", Feb. 1991, Info World Impression, V. 13, Issue 5.
New Box Specification, dated Mar. 6, 1991.
Novak, T. "Remote Management of Individual Power Supplies", netman.cit.buffalo.edu/CDN-M, p. 1, May 10, 1995.
Power-On product wrapper © 1991.
Remote Power-On/Off product wrapper © 1991.
RPM-15 Power Module Specification, Mar. 18, 1991.
Sentry 110/230 VAC Product Family © 2000.
Sentry Administrator R-450 © 2001/2002.
Sentry Administrator R-450 Remote Pwr. Mgr. © 1998.
Sentry Ambassador Remote Power Manager © 1996.
Sentry Commander R-400 Remote Power Mgr. © 2001/2002.

(56) References Cited

OTHER PUBLICATIONS

Sentry Commander R-400 Remote Pwr. Mgr. Datasheet 1999.
Sentry Expanded Function Power Tower (PTEF) © 2001/2002.
Sentry Power Manager—48 VDC Product Family © 2000.
Sentry Power Modules © 1999.
Sentry Power On/Off, Installation and Operations Manual, © 1991.
Sentry Power Tower Power Distribution © 2001/2002.
Sentry Power Tower Products © 2001/2002.
Sentry R-2000 Remote Power Manager © 2001.
Sentry Remote Power Manager brochure © 1991.
Sentry Remote Power Manager, Operational Instructions, Sep. 24, 1992.
Sentry Serial Power Tower (PTSS) © 2001/2002.
Server Technology, Inc., "Any-To-Any Matrix Communications Switch", 1996, Server Technology, Inc. Reno, Nevada.
Server Technology, Inc., "How Do You ReBoot Remote Equipment?", 1999, Server Technology, Inc., Reno, Nevada.
Server Technology, Inc., "LAN WAN, Enterprise, Internet Access Equipment", 1996, Server Technology, Inc., Reno, Nevada.
Server Technology, Inc., "Sentry Administrator R-450 Remote Power Manager", 1999, Server Technology, Inc., Reno, Nevada.
Server Technology, Inc., "Sentry Ambassador", 1996, Server Technology, Inc., Reno, Nevada.
Server Technology, Inc., "Sentry Communications and User Interface", 1996, Server Technology, Inc., Reno, Nevada.
Server Technology, Inc., "Sentry Power Modules", 1996, Server Technology, Inc., Reno, Nevada.
Server Technology, Inc., "Sentry R-2000 Remote Power Manager", 1999, Server Technology, Inc., Reno, Nevada.
Server Technology, Inc., "Sentry ShutDown Remote Power Manager", 1997, Server Technology, Inc., Reno, Nevada.
Server Technology, Inc., "SentryInternational", 1996, Server Technology, Inc., Reno, Nevada.
Server Technology, Inc., "SentryShelf", 1996, Server Technology, Inc., Reno, Nevada.
Slater, M., "Microprocessor-Based Design—A Comprehensive Guide to Hardware Design", pp. 19-24, 1989.
Defendant's First Amended Answer and Affirmative Defenses to Plaintiffs Complaint for Patent Infringement; Counterclaims for Declaratory Judgment of Patent Noninfringement and Patent Invalidity; and Patent Infringement, Case No. 3:06-CV-00698-LRH-(VPC), 36 pp. (Apr. 13, 2007).
Claim Construction Order, *Server Technology, Inc. v. American Power Conversion Corporation*, Case No. 3:06-CV-00698-LRH-VPC, 41 pp. (Apr. 19, 2010).
Server Technology, Inc.'s Motion for Leave to File Instanter Second Amended Complaint, *Server Technology, Inc. v. American Power Conversion Corporation*, Case No. 3:06-CV-00698-LRH-VPC, 112 pp. (May 5, 2010).
APC's Answer, Affirmative Defenses, and Counterclaims to STI's Second Amended Complaint for Patent Infringement and Demand for Jury Trial, *Server Technology, Inc. v. American Power Conversion Corporation*, Case No. 3:06-CV-00698-LRH-VPC, 22 pp. (Oct. 8, 2010).
"PC 5585: Voltage Selectable for 120V.about. or 240V.about., 1O, 50/60 Hz Up to 30A," Pulizzi Engineering Inc., 3 pp. (1999).
"TPC 4000/MTD: World's First 1U, 3O, 16A or 32A Distribution Unit," Pulizzi Engineering Inc., 2 pp. (1999).
Pinherio et al.; "Load Balancing and Unbalancing for Power and Performance in Cluster-Based Systems"; May 2001; Department of Computer Science; Rutgers University; Technical Report DCT-TR-440; 11 pp.
Research Disclosure Database No. 419103, IBM, Mar. 1999.
Stevens, W. R., "TCP/IP Illustrated, vol. 1—The Protocols", pp. 359-361, 1994.
Office Action dated Jun. 8, 2010; U.S Appl. No. 11/738,417.
Office Action dated Nov. 28, 2011; U.S. Appl. No. 12/853,193.
Office Action dated Feb. 12, 2013; U.S. Appl. No. 13/195,836; 22 pp.
Office Action dated Feb. 15, 2013; U.S. Appl. No. 13/290,944; 16 pp.
Office Action dated Feb. 19, 2013; U.S. Appl. No. 12/853,193; 23 pp.
Server Technology, Inc., "Sentry Power Tower", 2000, Server Technology, Inc., Reno, Nevada.
Server Technology, Inc., "SentryRack", 1996, Server Technology, Inc., Reno, Nevada.
IBM Technical Disclosure Bulletin, "Remote Environmental Monitor for Unattended Computer Operations", Feb. 1990, vol. 32, pp. 264-266.
J Case, RFC 1628, May 1994, SNMP Research Inc. pp. 1-36.

\* cited by examiner

POWER-MANAGER CONFIGURATION UPLOAD AND DOWNLOAD METHOD AND SYSTEM FOR NETWORK MANAGERS

CROSS REFERENCE TO RELATED APPLICATIONS

This application is a continuation of U.S. patent application Ser. No. 09/892,350, now U.S. Pat. No. 7,774,443, filed Jun. 26, 2001, titled POWER-MANAGER CONFIGURATION UPLOAD AND DOWNLOAD METHOD AND SYSTEM FOR NETWORK MANAGERS, the entire disclosure of which is incorporated herein by reference.

This application is related to U.S. patent application Ser. No. 09/732,557, filed Dec. 8, 2000, titled NETWORK-CONNECTED POWER MANAGER FOR REBOOTING REMOTE COMPUTER-BASED APPLIANCES, and issued on Aug. 29, 2006 as U.S. Pat. No. 7,099,934; U.S. patent application Ser. No. 09/375,471, filed Aug. 16, 1999, titled REMOTE POWER CONTROL SYSTEM THAT VERIFIES WHICH DEVICES IS SHUT-DOWN BEFORE SUCH ACTION IS COMMITTED TO, and issued on Mar. 23, 2004 as U.S. Pat. No. 6,711,613; and U.S. patent application Ser. No. 08/685,436, filed Jul. 23, 1996, titled SYSTEM FOR READING THE STATUS AND CONTROLLING THE POWER SUPPLIES OF APPLIANCES CONNECTED TO COMPUTER NETWORKS, and issued on Sep. 7, 1999 as U.S. Pat. No. 5,949,974. The entire disclosure of each of these applications is incorporated herein by reference.

BACKGROUND

1. Field

The invention relates generally to remote power management systems, and more particularly to uploading and downloading user configuration information in bulk to avoid time-consuming and tedious power-manager configuration dialogs and scripts.

2. Description of the Prior Art

Remotely located power managers at network equipment centers typically need to be configured by either the installer or network administrator. When only a few power controllers and options are being handled, such configuration management is next to trivial. But large network server farms, hotels, and other concentrated-equipment sites are being put in all around the world. The numbers of controlled equipment, and the numbers of sites can be overwhelming. Manually peeking and poking at the configuration from a network administrator's control panel is not very feasible for these major installations.

SUMMARY OF THE PRESENT INVENTION

Briefly, a power management system embodiment of the present invention comprises a power manager with a network agent in communication over a network with a network manager. The power manager is connected to control the operating power flowing to various pieces of computer network equipment at a single site. A user is able to assign names to each control port, and the power manager maintains a list of enrolled users who have access. Many operational mode choices are possible, and each can be configured by the user while remote from the power manager. The power manager can be commanded to upload a user configuration list, and it can be commanded to accept a downloaded user configuration list.

An advantage of the present invention is that a system and method are provided that can speed the configuration of a power manager.

Another advantage of the present invention is that a system and method are provided for duplicating, modifying, and replicating user configurations for power managers.

A further advantage of the present invention is that a system and method are provided that allows a network console operator to control the electrical power status of a router or other network device.

A still further advantage of the present invention is that a system and method are provided for reducing the need for enterprise network operators to dispatch third party maintenance vendors to remote equipment rooms and POP locations simply to power-cycle failed network appliances.

Another advantage of the present invention is that a system and method are provided for reducing the time it takes to restore a failed network appliance and improving service levels.

Another advantage of the present invention is that a system and method are provided for reducing organization losses from network downtime.

These and many other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
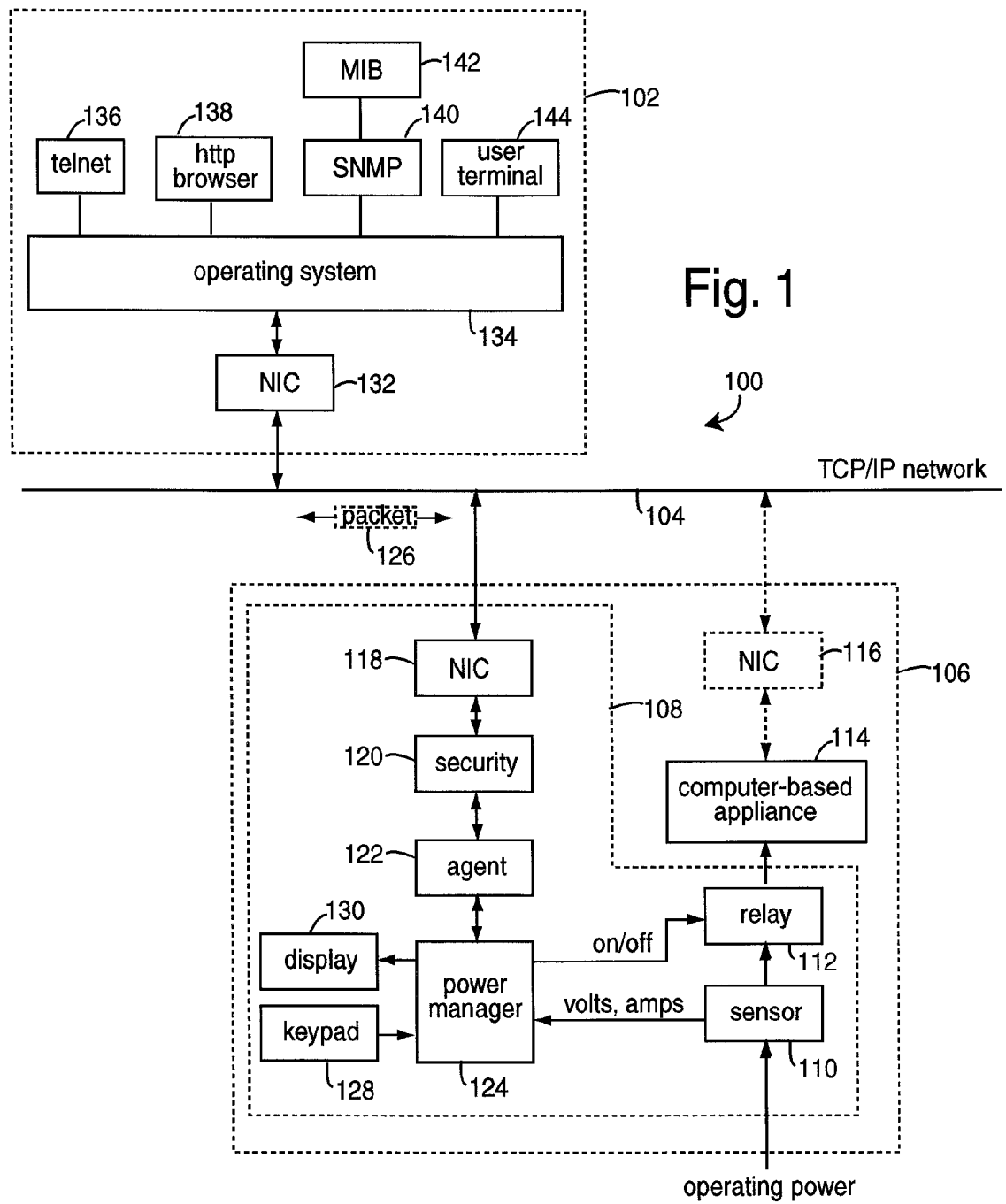
FIG. 1 is a functional block diagram of a power manager system embodiment of the present invention that is able to pass user configuration data over a computer data network like the Internet.

FIG. 1 represents a power manager system embodiment of the present invention, and is referred to herein by the general reference numeral 100. A network management system (NMS) 102 is connected by a network 104 to a remote site 106. A power controller 108 forwards operating power through a sensor 110 and relay-switch 112 to a computer-based appliance 114. Such operating power can be the traditional 110 VAC or 220 VAC power familiar to consumers, or direct current (DC) battery power familiar to telephone central-office "plant" employees. A network interface controller (NIC) 116 may be used to connect the computer-based appliance 114 to the network 104. Such would be especially true if the computer-based appliance 114 were a server, router, bridge, etc.

The power controller 108 can be configured to operate in a number of different modes, and such options are selected and stored in a configuration memory. The NMS 102 may download configurations to power controller 108, and may upload them for editing, archiving, and/or duplication to other power controllers 108 at other remote sites 106. Embodiments of the present invention are directed towards systems and methods that do such uploading, downloading, editing, archiving, and duplication of power manager configuration files.

The power manager system 100 maintains the operating health of the computer-based appliance 114. Such computer-based appliance 114 is prone to freezing or crashing where it is effectively dead and unresponsive. It is also some mission-critical assignment that suffers during such down time. It is therefore the role and purpose of the power manager 100 to monitor the power and environmental operating conditions in which the computer-based appliance 114 operates, and to afford management personnel the ability to turn the computer-based appliance 114 on and off. Such allows a power-on rebooting of software in the computer-based appliance 114 to be forced remotely from the NMS 102. The operating conditions and environment are preferably reported to the NMS 102 on request and when alarms occur.

The power controller 108 further includes a network interface controller (NIC) 118, and this may be connected to a security device 120. If the network 104 is the Internet, or otherwise insecure, it is important to provide protection of a network agent 122 from accidental and/or malicious attacks that could disrupt the operation or control of the computer-based appliance 114. At a minimum, the security device 120 can be a user password mechanism. Better than that, it could include a discrete network firewall and data encryption.

The network agent 122 interfaces to a remote power manager 124, and it converts software commands communicated in the form of TCP/IP datapackets 126 into signals the remote power manager can use. For example, messages can be sent from the NMS 102 that will cause the remote power manager 124 to operate the relay-switch 112. In reverse, voltage, current, and temperature readings collected by the sensor 110 are collected by the remote power manager 124 and encoded by the network agent 122 into appropriate datapackets 126. Locally, a keyboard 128 can be used to select a variety of readouts on a display 130, and also to control the relay-switch 112.

The display 130 and keyboard 128 can be connected as a terminal through a serial connection to the power manager 124. Such serial connection can have a set of intervening modems that allow the terminal to be remotely located. The display 130 and keyboard 128 can also be virtual, in the sense that they are both emulated by a Telnet connection over the network 104.

The NMS 102 typically comprises a network interface controller (NIC) 132 connected to a computer platform and its operating system 134. Such operating system can include Microsoft WINDOWS-NT, or any other similar commercial product. Such preferably supports or includes a Telnet application 136, a network browser 138, and/or an SNMP application 140 with an appropriate MIB 142. A terminal emulation program or user terminal 144 is provided so a user can manage the system 100 from a single console.

If the computer-based appliance 114 is a conventional piece of network equipment, e.g., as supplied by Cisco Systems (San Jose, Calif.), there will usually be a great deal of pre-existing SNMP management software already installed, e.g., in NMS 102 and especially in the form of SNMP 140. In such case it is usually preferable to communicate with the network agent 122 using SNMP protocols and procedures. Alternatively, the Telnet application 136 can be used to control the remote site 106.

An ordinary browser application 138 can be implemented with MSN Explorer, Microsoft Internet Explorer, or Netscape NAVIGATOR or COMMUNICATOR. The network agent 122 preferably includes the ability to send http-messages to the NMS 102 in datapackets 126. In essence, the network agent 122 would include an embedded website that exists at the IP-address of the remote site 106. An exemplary embodiment of a similar technology is represented by the MASTER-SWITCH-PLUS marketed by American Power Conversion (West Kingston, R.I.).

Many commercial network devices provide a contact or logic-level input port that can be usurped for the "tickle" signal. Cisco Systems routers, for example, provide an input that can be supported in software to issue the necessary message and identifier to the system administrator. A device interrupt has been described here because it demands immediate system attention, but a polled input port could also be used.

Network information is generally exchanged with protocol data unit (PDU) messages, which are objects that contain variables and have both titles and values. SNMP uses five types of PDUs to monitor a network. Two deal with reading terminal data, two deal with setting terminal data, and one, the trap, is used for monitoring network events such as terminal start-ups or shut-downs. When a user wants to see if a terminal is attached to the network, for example, SNMP is used to send out a read PDU to that terminal. If the terminal is attached, a user receives back a PDU with a value "yes, the terminal is attached". If the terminal was shut off, a user would receive a packet informing them of the shutdown with a trap PDU.

In alternative embodiments of the present invention, it may be advantageous to include the power manager and intelligent power module functions internally as intrinsic components of an uninterruptable power supply (UPS). In applications where it is too late to incorporate such functionally, external plug-in assemblies are preferred such that off-the-shelf UPS systems can be used.

Once a user has installed and configured the power manager 108, a serial communications connection is established. For example, with a terminal or terminal emulation program. Commercial embodiments of the present invention that have been constructed use a variety of communications access methods.

For modem access, the communication software is launched that supports ANSI or VT100 terminal emulation to dial the phone number of the external modem attached to the power manager. When the modems connect, a user should see a "CONNECT" message. A user then presses the enter key to send a carriage return.

For direct RS-232C access, a user preferably starts any serial communication software that supports ANSI or VT100 terminal emulation. The program configures a serial port to one of the supported data rates (38400, 19200, 9600, 4800, 2400, 1200, and 300 BPS), along with no parity, eight data bits, and one stop bit, and must assert its Device Ready signal (DTR or DSR). A user then presses the enter key to send a carriage return.

For Ethernet network connections, the user typically connects to a power manager 108 by using a TELNET program or TCP/IP interface. The power manager will automatically detect the data rate of the carriage return and send a username login prompt back to a user, starting a session. After the carriage return, a user will receive a banner that consists of the word "power manager" followed by the current power manager version string and a blank line and then a "Username:" prompt.

A user logged in with the administrative username can control power and make configuration changes. A user logged in with a general username can control power. Also, while a user logged in with the administrative username can control power to all intelligent power modules, a user logged in with a general username may be restricted to controlling power to a specific intelligent power module or set of intelligent power modules, as configured by the administrator.

A parent case, U.S. patent application Ser. No. 09/732,557, filed Dec. 8, 2000, titled NETWORK-CONNECTED POWER MANAGER FOR REBOOTING REMOTE COMPUTER-BASED APPLIANCES, includes many details on the connection and command structure used for configuration management of power manager embodiments of the present invention. Such patent application is incorporated herein by reference and the reader will find many useful implementation details there. Such then need not be repeated here.

Referring again to FIG. 1, a user at the user terminal 144 is able to send a command to the power manager 124 to have the power manager configuration file uploaded. The power manager 124 concentrates the configuration data it is currently operating with into a file. The user at user terminal 144 is also able to send a command to the power manager 124 to have it accept a power manager configuration file download. The download file then follows. Once downloaded, the power manager 124 begins operating with that configuration if there were no transfer or format errors detected. These commands to upload and download configuration files are preferably implemented as an extension to an already existing repertoire of commands, and behind some preexisting password protection mechanism. HyperTerminal, and other terminal emulation programs allow users to send and receive files.

In a minimal implementation, the power manager configuration files are not directly editable because they are in a concentrated format. It would, however be possible to implement specialized disassemblers, editers, and assemblers to manipulate these files off-line.

Figure 2:
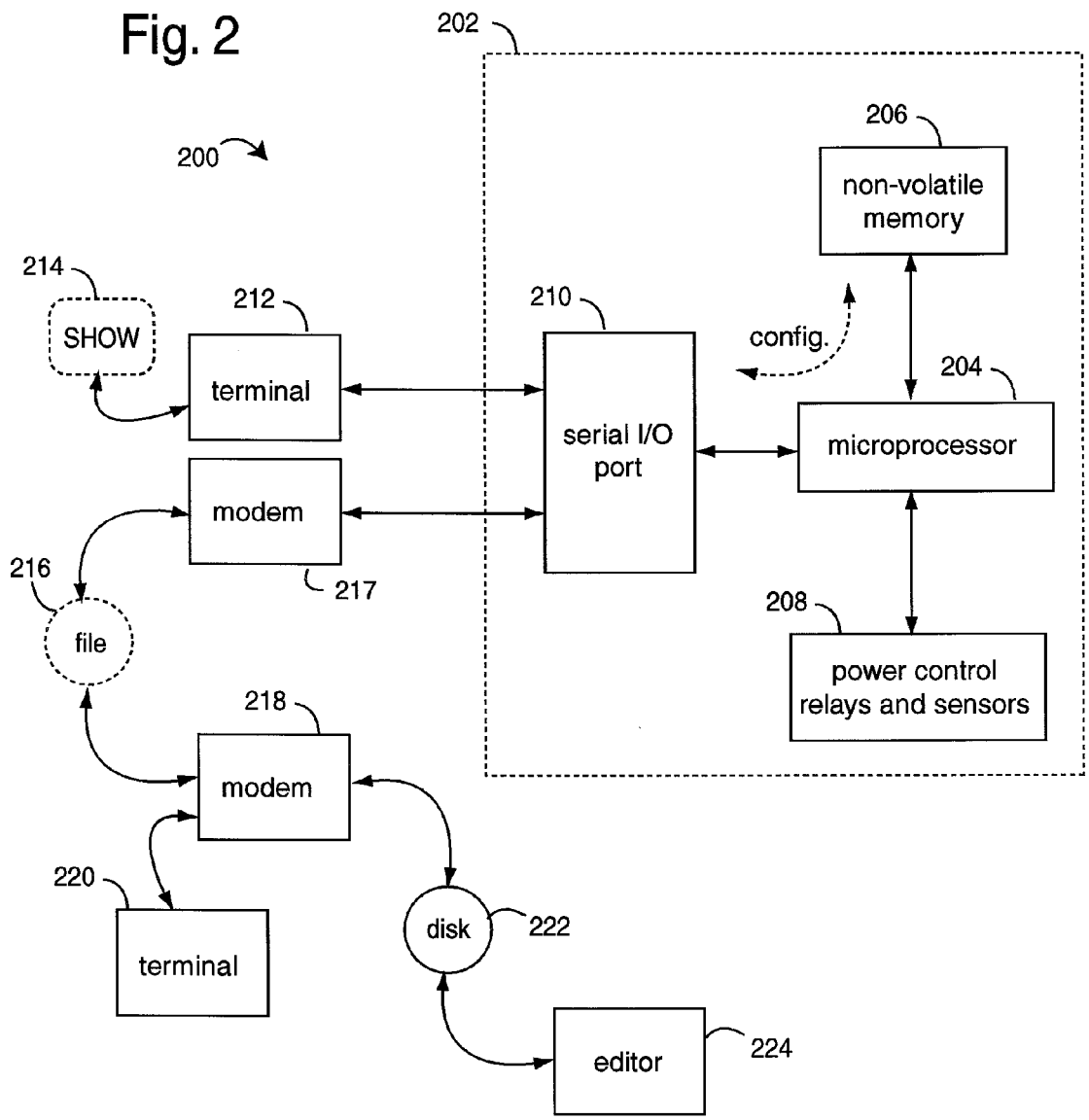
FIG. 2 is a functional block diagram of a power manager embodiment of the present invention showing the configuration and flow of user configuration files and display screens.

FIG. 2 represents a power management system 200 that includes a power controller 202. A microprocessor 204 is connected to a non-volatile memory 206 that can store user configuration data, e.g., user-assigned names for various controlled ports. A plurality of power control relays and sensors 208 respond to various control signals issued by the microprocessor 204 and are dependent on the user configuration data. A serial input/output (I/O) port 210 allows the configuration data to be inspected or modified via a data terminal 212. For example, a SHOW display screen 214 on the terminal 212 graphically displays all user configuration choices in the memory 206.

Alternatively, the user configuration can be transferred in a file 216 over a data modem pair 217-218 to a remote terminal 220. The file 216 may also be uploaded or downloaded from a disk 222. An off-line editor 224 allows the user configuration file to be created, uploaded-modified, and downloaded. For example, where many power management systems 202 are being installed or maintained, the user configuration file 216 corresponding to each can be individually customized by the editor 224. Such could save a great deal of time, effort, and expense.

Figure 3:
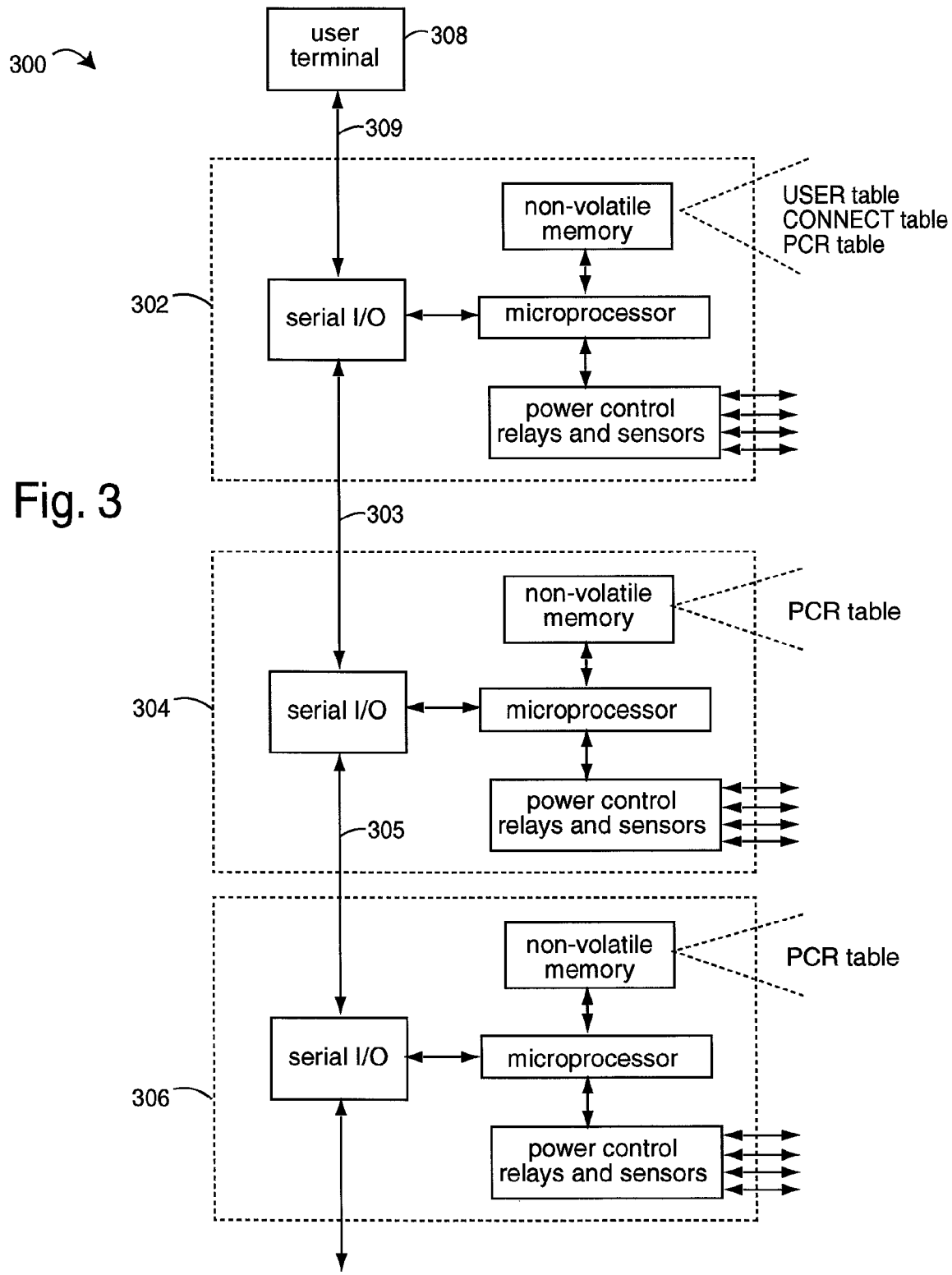
FIG. 3 is a functional block diagram of a number of power managers in a system embodiment of the present invention that have been connected in a daisy-chain serial arrangement to expand the number of power control points possible.

FIG. 3 is a diagram of an expandable power management system 300. In one commercial embodiment of the present invention, a first power controller board 302 is daisy-chain connected through a serial cable 303 to a second power controller board 304. In turn, the second power controller board 304 is connected through a serial cable 305 to a third power controller board 306. All three power controller boards can communicate with a user terminal 308 connected by a cable 309, but such communication must pass through the top power controller board 302 first.

Alternatively, the user terminal can be replaced by an IP-address interface that will provide a webpresence and interactive webpages. If then connected to the Internet, ordinary browsers can be used to upload and download user configurations.

Each power controller board is preferably identical in its hardware and software construction, and yet the one placed at the top of the serial daisy-daisy-chain is able to detect that situation and take on a unique role as gateway. Each power controller board is similar to power controller 202 (FIG. 2). Each power controller board communicates with the others to coordinate actions. Each power controller board independently stores user configuration data for each of its power control ports. A typical implementation will have four relay-operated power control ports. Part of the user configuration can include a user-assigned name for each control port.

A resynchronization program is executed in each microprocessor of each power controller board 302, 304, and 306, that detects where in the order of the daisy-chain that the particular power controller board is preferably located. The appropriate main program control loop is selected from a collection of firmware programs that are copied to every power controller board. In such way, power controller boards may be freely added, replaced, or removed, and the resulting group will resynchronize itself with whatever is present.

The top power controller board 302 uniquely handles interactive user log-in, user-name tables, its private port names, and transfer acknowledgements from the other power controller boards. All the other power controller boards concern themselves only with their private resources, e.g., port names.

During a user configuration file upload, power controller board 302 begins a complete message for all the power controller boards in the string with the user-table. Such is followed by the first outlets configuration block from power controller board 302, and the other outlet configuration blocks from power controller boards 304 and 306. The power controller board 302 tells each when to chime in. Each block carries a checksum so transmission errors can be detected. Each block begins with a header that identifies the source or destination, then the data, then the checksum.

During a user configuration file download, power controller board 302 receives a command from a user that says a configuration file is next. The user-name table and the serial-name table is received by power controller board 302 along with its private outlets configuration block and checksum. The next section is steered to power controller board 304 and it receives its outlets configuration block and checksum. If good, an acknowledgement is sent to the top power controller board 302. The power controller boards further down the string do the same until the whole download has been received. If all power controller boards returned an acknowledgement, the power controller board 302 acknowledges the whole download. Operation then commences with the configuration. Otherwise a fault is generated and the old configuration is retained.

Figure 4:
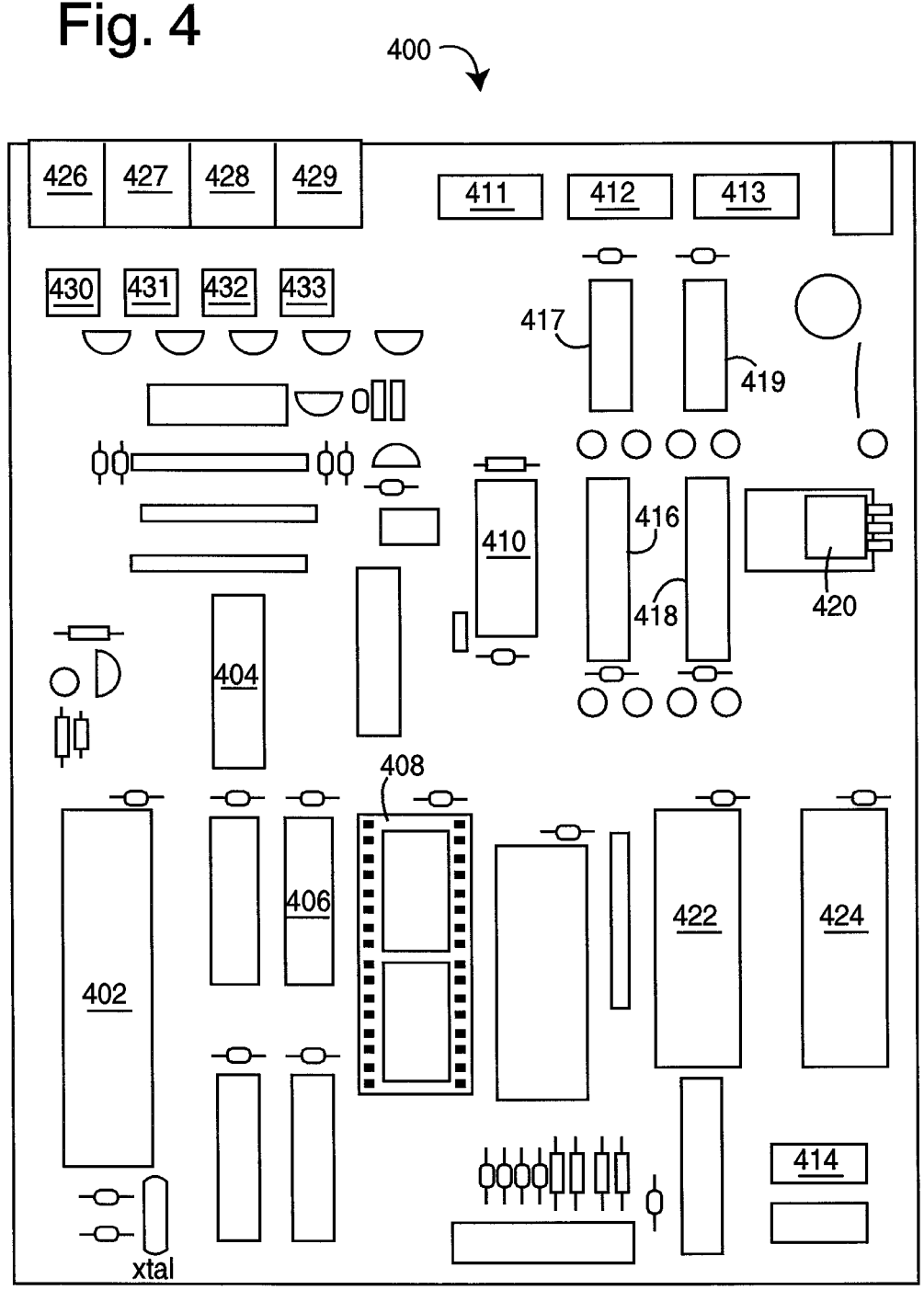
FIG. 4 is a plan view of a layout of a printed circuit board for a power manager in one embodiment of the present invention that has reduced EMI levels.

FIG. 4 is a plan view of a power controller printed circuit board (PCB) 400, in an implementation of power controller boards 302, 304, and 306. A microprocessor (CPU) 402 comprises a Dallas Semiconductor DS80C320, which is a CMOS derivative of an Intel 8051. A pair of programmable array logic (PAL) devices 404 and 406 do I/O port and memory address decoding. A socket 408 is provided for a two M-bit flash memory device that will ultimately store the user configuration data. A PIC-microcontroller 410, e.g., a Microchip Technology (Chandler, Ariz.) PIC16F84A device, talks with a temperature sensor, controls serial communication data rates, and secures the flash memory in socket 408. It further is responsible for LED blink synchronization amongst the power controller boards. Four serial I/O connectors 411-414 are RS-232 interfaced by a set of level conversion interface chips 416-419. A three-terminal regulator 420 provides operating power for the digital logic. A pair of analog matrix devices 422 and 424, e.g., CD74HC22106 types, allow the serial I/O ports to be interconnected in a variety of arrangements. A set of four RJ-11 type connectors 426-429 respectively connect to four power-control relay boards (see FIG. 5) that actually switch high-current utility circuits to network appliances. A set of two-wire connectors 430-433 can be used to forewarn each network appliance that its utility power is about to be interrupted, e.g., so a graceful shutdown can be executed.

Such PIC-microcontroller 410 preferably includes a code protection bit that can be permanently set to make its internal program code unreadable. Such then allows the PIC-microcontroller 410 to act as a tamper-protection device for the whole PCB 400, and especially for the program code and data executing and passing through CPU 402 from the flash memory.

Electromagnetic interference (EMI) is now a major concern among governments and equipment manufacturers/users. So the PCB 400 has been implemented as a four-layer board with its signal layers on the outside and the power-planes on the inside. Such construction has been found to reduce EMI to acceptable levels.

DB-9-connectors had been used on previous products, but it was learned that IDC-10 type connectors were more reliable and did not express the micro-shorting behavior of the conventional connectors. These IDC-10 connectors allow mass termination with ribbon conductor cable types, and so are easier to manufacture.

Figure 5A:
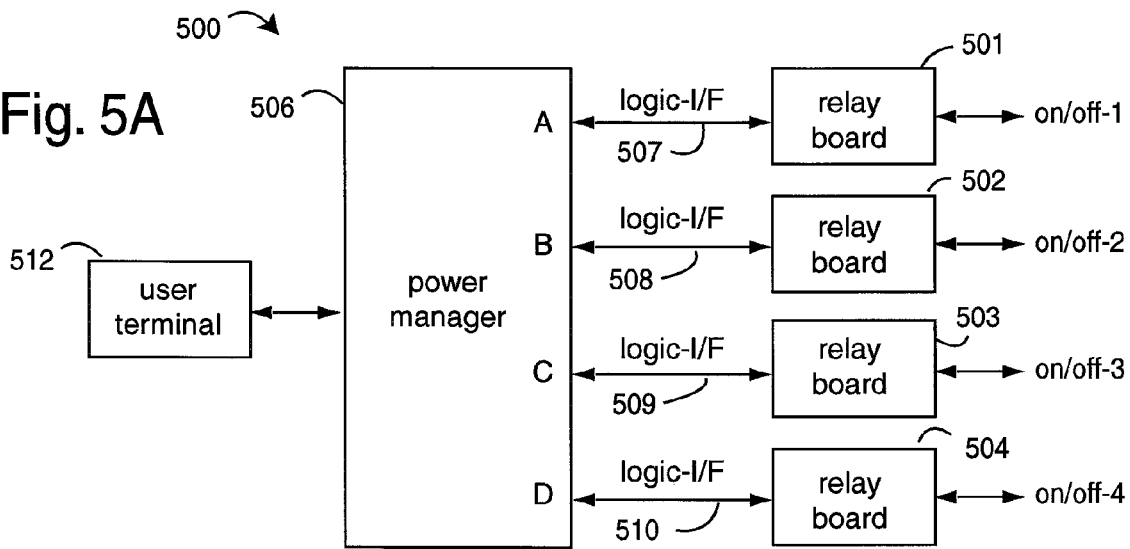
FIGS. 5A and 5B are functional block diagrams of how a power manager with only four logic-level power-control points and modular output connectors can be expanded to serially control sixteen power-control points.

FIG. 5A represents a basic power control system 500 that includes four single-point relay boards 501-504 that are able to independently control the operating power flowing to various pieces of network equipment and other appliances. Each relay board 501-504 is separately connected to a power manager 506, e.g., with a three-wire cable 507-510 and RJ-11 type plugs and jacks. A user can control the system 500 from a user terminal 512.

Figure 5B:
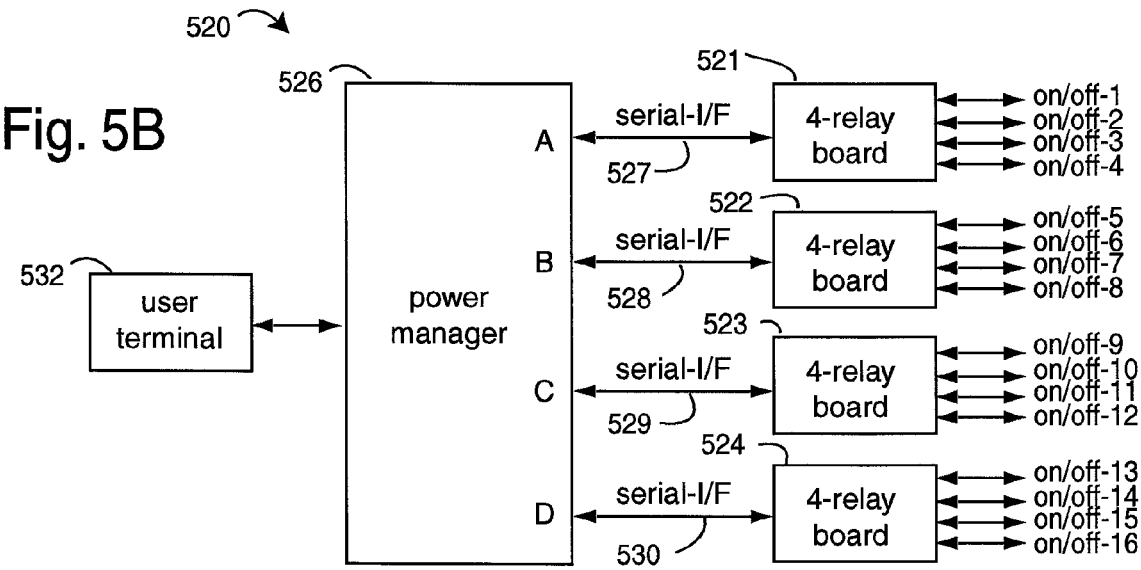

FIG. 5B represents an expanded power control system 520 that includes four four-point relay boards 521-524. This array is able to independently control the operating power flowing to sixteen pieces of network equipment and other appliances. Each relay board 521-524 is separately connected via a serial RS-232 communications link to a power manager 526, e.g., with a three-wire cable 527-530 and RJ-11 type plugs and jacks. A user can control the system 520 from a user terminal 532. Preferably, the power managers 506 and 526 differ only in their programming, and not in their constituent hardware. Logic level relay boards require only two-wires (control signal and common), but serial relay boards require three wires (data send, data receive, and common). Even logic level boards use three wires, with the third wire being used for the relay board to report power output status (on or off) back to the power controller circuit board.

Each relay board 521-524 includes a PIC-microcontroller, e.g., a Microchip Technology (Chandler, Ariz.) PIC16F84A device, that controls the serial communication interface with the power manager 526. Serial data is interpreted by the microcontroller and is used to independently operate each of the relay board's several onboard relays. Such serial communication and therefore the microcontroller isn't necessary for the relay boards 501-504 (FIG. 5A).

In a preferred application, the expanded power control system 520 is used instead of daisy-chain connecting power managers to get more control points. For example, power controller boards 304 and 306 (FIG. 3) could be eliminated and still as many as sixteen control points can be accommodated. The configuration in FIG. 3 would otherwise accommodate twelve control points as shown.

In general, power controller embodiments of the present invention will have a number of configuration parameters that are set by users. These include descriptions of the type of power controller hardware present, e.g., the type, number and capabilities of the various intelligent power modules (IPM's) and sensors. The power controller configuration attaches names to power control relays (PCR's), and other components. The configuration can be used to switch serial connections, and control usernames, passwords and access to control of power controller PCR's based on the login username.

The power controller configuration data is preferably located in a single 256-byte memory on each board. Even in a daisy-chain of power controller boards, each memory is used to store information about the board it is on. The memory at least contains all configuration information specific to the particular power controller board. A first board in a power controller board daisy-chain further includes a list of defined users and the passwords associated with the users, and a list of alias names associated with serial connections that can be accessed via a power-controller CONNECT command.

The first board in a power controller board daisy-chain uniquely maintains a username and password table for user login validation. User access to particular PCR's is based on an access bit map for each PCR associated with the power controller board. When the first board in a daisy-chain has verified a username, a user identification number associated with the username is activated and is used by all boards to allow access to various power controller resources. Saving and restoring power controller configuration information involves the 256-byte memory on each board in the daisy-chain. The username and serial name tables for all boards in a daisy-chain are kept only on the first board in the power controller board.

A command retrieves configuration data from the power controller, and another sends the data to the power controller. Initially, the configuration data is passed between users and the power controller via an ASCII file upload and download. Such upload and download is performed via a standard terminal emulation program such as the Windows HYPERTERM program. Once the code is completed on the power controller to allow this simple mechanism to save and restore power controller configuration, the next phase of this development effort is to create a Windows based program that will automate the configuration upload and download. In addition to automating the upload/download procedure for Windows users, this program further provides a graphical user interface program to allow Windows users the ability to view and manipulate a power controller configuration file.

A power controller configuration save/restore command includes various parameters. Depending on the action requested by the user (via the command parameters) the command interacts with the user to either set up an ASCII file upload or download. The ASCII data that is sent or received contains the power controller configuration information.

An SCFG command is used initiate a configuration upload or download, depending on a parameter supplied, e.g., SCFG SAVE|RESTORE. The SCFG command is used to copy the power controller configuration information from the power controller when the SAVE parameter is specified, and to copy the power controller configuration information to the power controller when the RESTORE parameter is specified. If the command is simply used with no parameters, an error message is displayed that lists the allowable parameters. If the SAVE parameter is specified, the user is prompted to press "Q" for quit, "C" for continue, or "D" for delay. The continue option will cause the power controller to start sending configuration data immediately. The delay option inserts a sixty second delay before sending the configuration data.

When the power controller has sent all of its configuration data, a message is displayed, "Configuration Send Complete—stop receiving ASCII data". The usual power-controller prompt is displayed signaling the upload is complete.

If the RESTORE parameter was specified, a message, "Ready to receive ASCII configuration data—begin sending ASCII configuration data" is displayed. The power controller begins parsing any received data for configuration information. The configuration data download is aborted if no data is received for sixty seconds, or if a Ctrl-C is received. If the data received does not conform to the expected configuration data format, the download is rejected. An appropriate message is displayed.

The power controller preferably waits to display any message until after the last character is received. Such delay helps ensure a configuration data stream does not obscure the message. The power controller automatically restarts using the existing configuration if the download was aborted or rejected. The configuration data transmissions preferably include checksums to improve data integrity. If the data and checksums add up wrong, the power controller rejects the data as being corrupted.

As long as the configuration data is not detected as being corrupted, the power controller will use as much of the download configuration data as possible to update the current configuration. Too much data for the board combination is not considered to be corrupted data. For example, it is possible to download configuration data for a ten-board power controller board daisy-chain to a two-board power controller board daisy-chain, or to download configuration data for a two-board power controller board daisy-chain to a ten-board power controller board daisy-chain. The power controller configuration does not revert to defaults if no configuration data is received, the current configuration remains in effect if no configuration data is received.

Once the power controller has successfully received an entire configuration data file, a message is displayed, "Configuration data successfully received for N power controller boards . . . . This power controller board daisy-chain contains M power controller boards . . . . WARNING—Only Partial Configuration Data Received . . . . Press Y)es to use this data or N)o to discard this data".

The WARNING message is only displayed if the number of power controller boards that the configuration file refers to does not match the number of power controller boards actually in the power controller board daisy-chain. The user then responds with a "Y" to cause the power controller to restart using the data or with an "N" to cause the power controller to restart using the previous configuration. The "Y" and "N" responses can be entered in either upper or lower case. If the users does not respond to the message within the standard five minute power controller prompt time out, the power controller will restart using the previous configuration data.

The power controller will display, "Restarting using configuration" or "Restarting using existing configuration". The SCFG command requires administrative username privileges to execute.

The configuration data that is sent to or from the power controller is sent in seven-bit ASCII format. There are two general data configuration blocks that are contained in the power controller configuration data. One of the general configuration blocks is used for comments while the other contains the actual power controller configuration data. During normal data stream parsing of a power controller configuration data stream, the processing code is sensitive to four possible events.

If sixty seconds elapse between characters in a power controller configuration data stream, the parsing assumes a problem exists with the configuration data and the process is aborted with appropriate messages. None of the data in a power controller configuration data stream is used. Such time out detection is active during all power controller configuration data stream parsing.

If a CTRL-C character is detected in the power controller configuration data stream, the parsing assumes the process is being aborted by user intervention and the process is aborted with appropriate messages. None of the data in a power controller configuration data stream is used. Such abort character detection and processing is active during all power controller configuration data stream parsing.

A comment data configuration block indicator (e.g., the "#") is received, if a "#" character is detected in the power controller configuration data stream, processing switches to the comment block data stream processing. Comment character parsing is only active during normal data stream parsing when neither a comment nor a configuration data block is being parsed.

A configuration data block indicator (e.g., the "$") is received, if a "$" character is detected in the power controller configuration data stream. Processing switches to the configuration block data stream processing. Configuration data block character parsing is only active during normal data stream parsing when neither a comment nor a configuration data block is being parsed.

A power controller configuration comment block is recognized by a "#" character. When the configuration data stream is being parsed in the normal data stream parsing mode, a "#" indicates the beginning of a general comment block. When a "#" character is detected, normal data stream processing switches to comment block data stream processing. During comment block data stream processing, all data in the configuration data stream after the "#" character is treated as comment data until a carriage return or line feed character is received. The sixty-second time out and the CTRL C parsing and actions continue in effect.

The carriage return character (0x0D) signifies the end of a comment block and causes the parsing of a power controller configuration data stream to return to the normal data stream processing as described earlier.

The line feed character (0x0A) signifies the end of a comment block and causes the parsing of a power controller configuration data stream to return to the normal data stream processing.

There are no checksums associated with comment blocks and no additional checks for data integrity are performed on comment blocks. Once a carriage return or line feed is detected in the comment block data, normal data stream processing continues. It is possible for garbage characters to exist in the configuration data stream between comment blocks and configuration data blocks. Garbage characters that occur between valid configuration blocks are ignored (unless the character is a CTRL C which aborts the process).

A power controller configuration data record block is recognized by a "$" character. When the configuration data stream is being parsed in the normal data stream parsing mode, a "$" indicates the beginning of a configuration data record block. When a "$" character is detected, normal data stream processing switches to data record block data stream processing. During data record block data stream processing, the data that follows the "$" character is expected to be in the following format:

> bytes 1 and two
> bytes 3 and 4
> byte 5 and 6
> bytes 7 ... 516
> last two bytes
> count field
> board ID field
> record type field
> record data field
> checksum field The first two characters after the "$" represent the high nibble and the low nibble of a one-byte hexadecimal value in the range of 00 through FF, e.g., 0-255 decimal. Because the two characters in the count field represent a single hexadecimal byte, the characters are limited to the ASCII-0-9 digits and the upper case ASCII characters A through F. The value of the hexadecimal byte represented by the two characters in the count field is the actual number of hexadecimal bytes that are represented by the characters in the record data field. The count is not the actual number of characters that are transmitted in the record data field data stream since the representation of a single hexadecimal byte requires two characters (one character for each nibble). The maximum size of a power controller configuration data record block is five hundred eighteen characters. Two characters for count, plus two characters for board-ID plus two characters for record type, plus up to five hundred ten characters for record data, and two characters for checksum.

The two characters after the count field represent a one-byte hexadecimal value in the range of 00-1A (e.g., 0-26 decimal) that is the power controller board ID that the record data is associated with. The "00" value is a special value that is used to indicate the associated data record applies to all power controller boards in a daisy-chain. Other values are used to identify a specific power controller board in a daisy-chain to which the associated record data applies. The characters in this field are limited to the ASCII-0-9 digits and upper case ASCII "A" character.

The two characters after the board ID field represent a one-byte hexadecimal value in the range of 00 through 04 that is the record type identifier for this data record block. Currently five record types are defined as follows:

> 00 - configuration data general trailer record
> (MUST be last record)
> 01 - configuration data general header/version record
> (MUST be first record)
> 02 - user-name table entry record
> 03 - serial port name table entry record
> 04 - power controller board page configuration table record Although only five record types are defined at this time, the structure allows expansion up to two hundred fifty-six different record types. Record type 01 must be the first record in the power controller configuration data stream and record type 00 must be the last record in the power controller configuration data stream.

In the record data field, the record type field is from zero to five hundred ten characters that represent up to two hundred fifty-five hexadecimal bytes of configuration data. Each character in the record data field represents a nibble of a single hexadecimal byte. As a result the number of characters in the record data field must be an even number of characters. The characters are limited to the ASCII-0-9 digits and the ASCII A-F characters (upper case only).

Following the record data field is a two-character field that represents a single hexadecimal byte, which is the record checksum value. The checksum value is the value that when added to the sum of the values of all of the hexadecimal bytes that are represented by the characters in the data stream will result in a value of zero. The checksum applies to actual hexadecimal values represented by the characters in the data stream, not to characters in the data stream. All of the fields in the configuration data record block (e.g., count field, board ID field, record type field, and record data field) are included in the sum to which the checksum value is applied.

The configuration data general header/version record is the identified by an ASCII-01 in the record type field. Such record provides information on the entire contents of the configuration data stream. Such record must be the first configuration data record block in a configuration data stream. Configuration data comment blocks may precede the current record in the configuration data stream, but the first configuration data record block must be a header/version record.

The count field of the current record is set to ASCII-04 to reflect the number of bytes of actual data that are contained in the record data field. The board ID field of the current record is set to ASCII-01 to indicate that the current record is directed towards the first board in the daisy-chain. The record data field of the general header/version record is formatted as follows:

> bytes 1 and two
> bytes 3 and 4
> bytes 5 and 6
> bytes 7 and 8
> version
> number of username table entry records
> number of serial port table entry records
> number of power controller board page configuration table records The first two characters in the record data field are an ASCII representation of the current version of this configuration data. The initial version value is set to ASCII-01. Following the version characters is a two-character ASCII representation of the number of username table entry records that are contained in this configuration data stream. The range of values is 00 through seventy-eight (e.g., 0 through one hundred twenty-eight decimal). A value of 00 indicates that there are no username table entry records in the configuration data stream. Following the number of username table entry records is a two-character ASCII representation of the number of serial port table entry records that are contained in this configuration data stream. The range of values is 00 through twenty (e.g., 0 through thirty-two decimal). A value of 00 indicates that there are no serial port table entry records in the configuration data stream. Following the number of serial port table entry records is a two-character ASCII representation of the number of power controller page configuration table records that are contained in this configuration data stream. The range of values is 00 through 1A (e.g., 0 through twenty-six decimal). A value of 00 indicates that there are no power controller configuration table records in the configuration data stream. All configuration data record blocks use the last two characters to represent the checksum value.

The username table entry record is the identified by an ASCII-02 in the record type field. Such record is used to send an entry in the power controller user-name table. These records can appear in any order in the configuration data stream except as the first or last configuration data record block in a configuration data stream. The count field of the current record is set to ASCII twenty-eight (e.g., forty decimal) to reflect the number of bytes of actual data that are contained in the record data field. The board ID field of the current record is set to ASCII-01 to indicate that the current record is directed towards the first board in the daisy-chain. The record data field of the username table entry record contains ASCII characters that represent the high and low nibbles of the actual hexadecimal bytes that make an entry in the power controller username table. The actual number of ASCII characters in the record data field is eighty (e.g., two characters for each hexadecimal byte). As with all configuration data record blocks, the last two characters contain the checksum value.

The serial port table entry record is identified by an ASCII-03 in the record type field. Such record is used to send an entry in the power controller serial port table. These records can appear in any order in the configuration data stream except as the first or last configuration data record block in a configuration data stream. The count field of the current record is set to ASCII twenty-eight (e.g., forty decimal) to reflect the number of bytes of actual data that are contained in the record data field. The board ID field of the current record is set to ASCII-01 to indicate that the current record is directed towards the first board in the daisy-chain. The record data field of the serial port table entry record contains ASCII characters that represent the high and low nibbles of the actual hexadecimal bytes that make an entry in the power controller serial port table. The actual number of ASCII characters in the record data field is eighty, e.g., two characters for each hexadecimal byte. As with all configuration data record blocks, the last two characters contain the checksum value.

The power controller board page configuration table entry is the identified by an ASCII-04 in the record type field. Such record is used to send an entire 256-byte power controller board configuration data area. The single byte count field in the configuration data record block limits the actual amount of data that can be represented in a record to two hundred fifty-five bytes. As a result, the first byte of the power controller board configuration data area is not included in the data. Such byte is used internally by the power controller code for virtual power controller purposes and is not required nor desired to be included in the configuration data. These records can appear in any order in the configuration data stream except as the first or last configuration data record block in a configuration data stream.

The count field of the current record is set to ASCII FF to reflect the number of bytes of actual data that are contained in the record data field. The board ID field of the current record is set to reflect the ASCII representation of the unit ID of the power controller board to which the record applies. The record data field contains ASCII characters that represent the high and low nibbles of the actual hexadecimal bytes of the power controller board configuration data area. The actual number of ASCII characters in the record data field is five hundred ten, e.g., two characters for each of the two hundred fifty-five hexadecimal bytes. As with all configuration data record blocks, the last two characters contain the checksum value.

The configuration data general trailer record is the identified by an ASCII-00 in the record type field. Such record is used to signal the end of the configuration data stream. Such record must be the last configuration data record block in a configuration data stream. Configuration data comment blocks may precede or follow the current record in the configuration data stream, but no additional configuration data record blocks may follow the current record. The count field of the current record is set to ASCII-00 to indicate there is no data in the record data field for the current record. The board ID field of the current record is set to ASCII-01 to indicate that the current record is directed towards the first board in the daisy-chain. As with all configuration data record blocks, the last two characters contain the checksum value.

An SCFG command initiates a configuration upload/download. The first board in a power controller board daisy-chain assumes control of all upload/download operations. A command line processor on the first board preferably evaluates the operation and signals the other boards in the daisy-chain. A SAVE operation uploads the power controller configuration from the power controller to the user system. A RESTORE operation downloads configuration data from a user system to the power controller.

When a user enters the SCFG command using a SAVE parameter, a power controller command processor code preferably prompts the user to prepare to received the configuration data as described in SCFG command description earlier in this document.

Once the user responds to the power controller prompt with an indication that the SAVE operation is to proceed. This may include a sixty second delay. The power controller code formats and sends a power controller internal command to the power controller board daisy-chain to inform them that a configuration send is in progress. The first-in-daisy-chain board then formats and sends the configuration data general header/version record to the user. Then a record is sent for all active username table and serial port table entries. Then a record is formatted and sent for each of the 256-byte configuration blocks for each virtual sentry, if there are more than one. Once all of the configuration data is sent by the first-in-daisy-chain board, the first-in-daisy-chain board raises DTR to the daisy-chain. Such causes each board to send its own 256-byte configuration block, one for each virtual sentry. As each board completes its configuration data send, it propagates DTR down the daisy-chain which causes all of the boards to send their configuration data. The first-in-daisy-chain board monitors the data traffic flowing from the downstream boards. When no data is transmitted for one or two seconds, the first-in-daisy-chain board assumes all data has been transmitted. At this point the first-in-daisy-chain board formats and sends the general trailer record and the upload is complete.

For configuration download (RESTORE), a user enters the SCFG command using a RESTORE parameter. The command processor on the first board in the daisy-chain sends an internal power controller command to all of the boards in the power controller board daisy-chain that informs them that a configuration data stream is to be received. Such is similar to a SET CODE UPLOAD command that puts all of the boards into a receive data mode, and causes a current configuration to be saved to flash ROM. However this command does not return to the system monitor. The power controller code that processes this command prepares to receive the configuration data and sends a positive response to the first board in the daisy-chain to indicate the configuration upload state is active. The first board in the daisy-chain waits for a response from all boards in the daisy-chain and then displays the download message to prompt the user to begin the configuration data send. A timer is set to allow the user five minutes to begin the configuration download. If the download fails for time out, invalid data detected, etc., an error message is displayed for twenty seconds. Then a power controller restart is initiated. The error message that is displayed in the event of an error is only displayed after a ten second time period has elapsed since the last character was received from the user. Such delay is incorporated to prevent the error message from colliding with an incoming data stream and therefore being lost.

The parsing that occurs during the data transfer is described in the power controller configuration data format section of this document. Individual power controller boards process data that is directed to them as necessary. If errors are detected, the individual power controller boards record the error and wait for the end of command condition to report the error.

Once the configuration data general trailer record is received, all boards verify their received data. Such verification includes verifying version number agreement between the configuration data and the existing data as well as checksum verification. The first-in-daisy-chain board propagates DTR down the daisy-chain and waits for a response from each board. Boards in the daisy-chain send a "+" to indicate the configuration was received and is verified. The boards send a "−" to indicate the received data was not verified. The boards send a "?" to indicate no configuration data was received for this board. If any boards report invalid data, the entire operation in aborted and the power controller is reset using the previous configuration data.

The first-in-daisy-chain board evaluates the responses from the other boards in the daisy-chain and sends a message to the user indicating the result of the command and prompting the user to commit the configuration. If the number of boards in the power controller board daisy-chain does not correspond to the number of configuration data records received or if some of the boards responded with a "?", a warning message is displayed in addition to the normal prompt messages to the user. Such warning message is to alert the user to discrepancy between the configuration data and the actual power controller board daisy-chain being configured.

Based on the users response to the prompt, the first-in-daisy-chain board sends a power controller internal command to the daisy-chain to signal the boards to save or ignore the configuration. The first board then displays the success message and after a twenty second delay, initiates a power controller restart. At this point the power controller will restart with either the configuration or with the existing configuration depending on the users response.

Although the present invention has been described in terms of the present embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A reconfigurable network-equipment power-management system, comprising:
    a power-distribution apparatus having a power input disposed in the power-distribution apparatus and a communication interface disposed in the power-distribution apparatus for communicating with a remote user system;
    a plurality of outlets disposed in the power-distribution apparatus, the plurality of outlets connectable in power supply communication with the power input and one or more separate electronic appliances;
    a configuration information file accessible by the remote user system, wherein the configuration information file comprises configuration data for at least two of the plurality of outlets disposed in the power-distribution apparatus;
    a memory disposed in the power-distribution apparatus and having a configuration information file storage area;
    at least one power controller disposed in the power-distribution apparatus, wherein the at least one power controller corresponds to at least two of the plurality of outlets, the at least one power controller comprising a configuration information file transfer mechanism in communication with the communication interface accessible by the remote user system, whereby the configuration information file transfer mechanism imports and exports the configuration information file between the power-distribution apparatus and the remote user system via the communication interface as a plurality of data packets; and
    a network agent executable by the power-distribution apparatus and communicably coupled between the at least one power controller and the remote user system, the network agent configured to convert values for one or more of voltage, current, and temperature readings into data packets for transmission to the remote user system.

2. The reconfigurable network-equipment power-management system of claim 1, wherein the configuration information file comprises a user-specified parameter for at least one of the plurality of outlets.

3. The reconfigurable network-equipment power-management system of claim 1, wherein the communication interface comprises a network interface controller.

4. The reconfigurable network-equipment power-management system of claim 1, wherein the communication interface comprises a jack or port.

5. The reconfigurable network-equipment power-management system of claim 1, wherein the configuration data in the configuration information file includes a description of a type of each power controller in the power distribution apparatus.

6. The reconfigurable network-equipment power-management system of claim 1, further comprising:
    a plurality of power-control relays disposed in the power-distribution apparatus, each of the power-control relays in power control communication with at least one among the plurality of outlets, whereby the plurality of outlets and the plurality of power-control relays provide operating power to the one or more separate electronic appliances and are able to interrupt the operating power to the one or more separate electronic appliances;
    wherein the configuration information file includes information for affecting the power provided or interrupted to the plurality of outlets.

7. The reconfigurable network-equipment power-management system of claim 6, wherein the configuration data in the configuration information file includes names of two or more of the power-control relays.

8. The reconfigurable network-equipment power-management system of claim 6, wherein the configuration data in the configuration information file includes a list of usernames and passwords for users having access rights to control the power-control relays.

9. The reconfigurable network-equipment power-management system of claim 1, wherein the configuration information file includes user-defined names for one or more of the plurality of outlets.

10. The reconfigurable network-equipment power-management system of claim 1, wherein the at least one power controller is configured to gather configuration settings from the power-distribution apparatus into the configuration information file prior to exporting the configuration information file, wherein the configuration settings includes the user-defined names for one or more of the plurality of outlets.

11. A power distribution apparatus, comprising:
a power input;
a communication interface for communicating with a remote user system;
a plurality of outlets;
a plurality of power-control relays affecting provision of power from the power input to the plurality of outlets;
a memory having a configuration file storage area for storing a configuration file, the configuration file accessible by the remote user system and affecting the provision of power from the power input to the plurality of outlets, the configuration file comprising configuration data for at least two of the plurality of outlets;
at least one programmable component for use in exporting the configuration file via the communication interface, wherein the at least one programmable component is configured to gather the configuration data from the power distribution apparatus into the configuration file prior to exporting the configuration file; and
a network agent executable by the power distribution apparatus and communicably coupled between the at least one programmable component and the remote user system, the network agent configured to convert values for one or more voltage, current, and temperature readings into data packets for transmission to the remote user system.

12. The power distribution apparatus of claim 11, wherein the at least one programmable component comprises a microprocessor responsive to a request of the remote user system to export the configuration file to the remote user system.

13. The power distribution apparatus of claim 12, wherein the at least one programmable component further comprises a programmable array logic device.

14. The power distribution apparatus of claim 11, wherein the memory is a flash memory.

15. The power distribution apparatus of claim 11, wherein the configuration file comprises a user-specified parameter for at least one of the plurality of outlets.

16. The power distribution apparatus of claim 11, wherein the communication interface comprises a network interface controller.

17. The power distribution apparatus of claim 11, wherein the communication interface comprises a jack or port.

18. The power distribution apparatus of claim 11, wherein the configuration data in the configuration file comprises a description of a type of each power-control relay in the power distribution apparatus.

19. The power distribution apparatus of claim 11, wherein the configuration data in the configuration file comprises names of two or more of the power-control relays.

20. The power distribution apparatus of claim 11, wherein the configuration data in the configuration file comprises a list of usernames and passwords for users having access rights to control the power-control relays.

21. The power distribution apparatus of claim 11, wherein the configuration data includes user-defined names for the at least two of the plurality of outlets.

22. A method of operating a power distribution apparatus, comprising:
receiving a configuration file upload command;
in response to the configuration file upload command, exporting a power manager configuration file, as a plurality of data packets, over a network from the power distribution apparatus to a remote user system, the power distribution apparatus having a plurality of internal power-control relays for selectively interrupting operating power to one or more outlets of the power distribution apparatus, said power manager configuration file affecting provision of power to a plurality of outlets of the power distribution apparatus, wherein the power manager configuration file includes user-defined names for the at least one of the outlets, wherein the power distribution apparatus is configured to gather configuration data from the power distribution apparatus into the power manager configuration file prior to exporting the power manager configuration file; and
executing a network agent with the power distribution apparatus, the network agent being configured to convert values for one or more voltage, current, and temperature readings into data packets for transmission to the remote user system.

23. A method of configuring a power distribution apparatus, comprising:
uploading a power manager configuration file, as a plurality of data packets, over a network from a first power distribution apparatus to a remote user system, the power manager configuration file affecting provision of power to outlets of the first power distribution apparatus which are electrically coupled to one or more power-control relays operative to selectively interrupt operating power to said outlets, wherein the power manager configuration file includes user-defined names for at least one of the outlets, wherein the first power distribution apparatus is configured to gather configuration data from the first power distribution apparatus into the power manager configuration file prior to exporting the power manager configuration file;
executing a network agent with the first power distribution apparatus, the network agent being configured to convert values for one or more voltage, current, and temperature readings into data packets for transmission to the remote user system; and
downloading at least a portion of the power manager configuration file, as a second plurality of data packets, over the network from the remote user system to a second power distribution apparatus to affect provision of power to outlets of the second power distribution apparatus.

24. A method of configuring a power distribution apparatus, comprising:
uploading a power manager configuration file, as a plurality of data packets, over a network from a first power distribution apparatus to a remote user system, the power manager configuration file comprising user-specified parameters for outlets of the first power distribution apparatus, wherein the power manager configuration file includes user-defined names for the outlets, wherein the first power distribution apparatus is configured to gather configuration data from the first power distribution apparatus into the power manager configuration file prior to exporting the power manager configuration file;

executing a network agent with the first power distribution apparatus, the network agent being configured to convert values for one or more voltage, current, and temperature readings into data packets for transmission to the remote user system; and downloading at least a portion of the power manager configuration file, as a second plurality of data packets, over the network from the remote user system to a second power distribution apparatus to configure user-specified parameters for outlets of the second power distribution apparatus.

25. A method of configuring a power distribution apparatus, comprising:

uploading a power manager configuration file, as a plurality of data packets, over a network from a first power distribution apparatus to a remote user system, the power manager configuration file affecting provision of power to outlets of the first power distribution apparatus which are electrically coupled to one or more power-control relays operative to selectively interrupt operating power to said outlets of the first power distribution apparatus, wherein the power manager configuration file includes user-defined names for at least one of the outlets, wherein the first power distribution apparatus is configured to gather configuration data from the first power distribution apparatus into the power manager configuration file prior to exporting the power manager configuration file; and executing a network agent with the first power distribution apparatus, the network agent being configured to convert values for one or more voltage, current, and temperature readings into data packets for transmission to the remote user system;

modifying the uploaded power manager configuration file;

downloading the modified uploaded power manager configuration file, as a second plurality of data packets, over the network from the remote user system to a second power distribution apparatus, the modified uploaded power manager configuration file affecting provision of power to outlets of the second power distribution apparatus.

* * * * *

UNITED STATES PATENT AND TRADEMARK OFFICE
CERTIFICATE OF CORRECTION

PATENT NO. : 9,104,393 B2  
APPLICATION NO. : 12/853193  
DATED : August 11, 2015  
INVENTOR(S) : Ewing et al.

Page 1 of 1

It is certified that error appears in the above-identified patent and that said Letters Patent is hereby corrected as shown below:

Title Page, item (56)

On page 3, in column 1, under "Other Publications", line 45, delete "Uninteruptible" and insert -- Uninterruptible --, therefor.

In the Specification

In column 5, line 39, delete "editers," and insert -- editors, --, therefor.

Signed and Sealed this  
Twenty-ninth Day of December, 2015

Michelle K. Lee  
*Director of the United States Patent and Trademark Office*